United States Patent [19]

Usami et al.

[11] Patent Number: 5,274,623
[45] Date of Patent: Dec. 28, 1993

[54] INFORMATION RECORDING MEDIUM HAVING HIGH MODULATION DEGREE

[75] Inventors: Yoshihisa Usami; Mitsuru Sawano; Takahito Miyoshi, all of Shizuoka, Japan

[73] Assignee: Fuji Photo Film Co., Ltd., Kanagawa, Japan

[21] Appl. No.: 732,186

[22] Filed: Jul. 18, 1991

[30] Foreign Application Priority Data

| Jul. 19, 1990 | [JP] | Japan | 2-191257 |
| Oct. 5, 1990 | [JP] | Japan | 2-267864 |
| Oct. 5, 1990 | [JP] | Japan | 2-267865 |

[51] Int. Cl.$^5$ .............................................. G11B 7/24
[52] U.S. Cl. ....................... 369/275.1; 369/275.4; 369/283; 369/288; 428/65; 428/913; 430/945
[58] Field of Search ............... 369/275.1, 275.4, 100, 369/283, 280, 286, 278, 288, 284, 121; 428/64, 65, 913; 430/270, 945

[56] References Cited

U.S. PATENT DOCUMENTS

| 4,752,554 | 6/1988 | Sato et al. | 369/284 |
| 4,860,273 | 8/1989 | Sawano et al. | 369/100 |
| 5,075,147 | 12/1991 | Usami et al. | 428/64 |
| 5,080,946 | 1/1992 | Takagisi et al. | 369/288 |
| 5,132,152 | 7/1992 | Gotoh et al. | 428/65 |
| 5,144,552 | 9/1992 | Abe | 369/275.4 |
| 5,161,150 | 11/1992 | Namba et al. | 369/275.4 |
| 5,204,153 | 4/1993 | Matsui et al. | 428/65 |
| 5,213,859 | 5/1993 | Aoi et al. | 428/65 |

Primary Examiner—Paul M. Dzierzynski
Assistant Examiner—Kim-Kwok Chu
Attorney, Agent, or Firm—Sixbey, Friedman, Leedom & Ferguson

[57] ABSTRACT

The information recording medium comprises a substrate provided with a prepit area and a pregroove area, a dye layer on the substrate and a reflecting layer on the dye layer, wherein the dye layer is a continuous layer formed on both the prepit area and the pregroove area, and the prepit area has a high modulation degree not less than 50%. Its embodiments are as follows: A medium in which a difference between an optical thickness of the dye layer on the bottom portion of a pregroove or a prepit and that of the dye layer on the land portion or a portion between prepits is not more than $\lambda/8$; one in which a prepit has a half width of 0.2 to 1.4 $\mu$m and a depth of 150 to 400 nm, the pregroove has a half width of 0.2 to 1.4 $\mu$m and a depth of 70 to 200 nm, the depth of the prepit is larger than the depth of the pregroove by not less than $\lambda/8$; and one in which wherein a relationship between a depth of a prepit and a thickness of said dye layer on the prepit and that between a depth of a pregroove and a thickness of a dye layer on the pregroove satisfies the specific conditions; and one in which least one of the prepit area and the pregroove area may be present in two or more places are disclosed.

11 Claims, 11 Drawing Sheets

INFORMATION RECORDING MEDIUM HAVING HIGH MODULATION DEGREE

BACKGROUND OF THE INVENTION

1. Field of the Invention

The present invention relates to an information recording medium for recording and reproducing information by means of a laser beam.

2. Description of Prior Art

Information recording media using a beam of high energy density such as a laser beam have been developed in recent years, and are now put into practical use. The information recording medium is generally called "optical disc", and can be used as a video disc and an audio disc as well as a disc memory for a large-capacity computer and a large capacity-static image file. Among these information recording media, a compact disc (i.e., CD) is now widely used as an audio disc for reproducing music or the like. The compact disc is used only for reproducing information of pit rows having been formed on a substrate in the preparation stage of the disc. In other words, the compact disc is prepared by molding an appropriate plastic material to form pits in the spiral form and then providing a metal layer as a reflecting layer on the surface thereof. Accordingly, the compact disc is a recording medium for only reproducing information.

Reading of information from the optical disc is carried out by irradiating the optical disc with a laser beam under rotation of the disc. The information is reproduced by detecting variation of the amount of a reflected light, the variation being caused by presence or absence of the pits on the disc. The compact disc used for only reproduction of information is so prepared that the information is read (reproduced) under rotation of the disc at a fixed linear speed of 1.2 to 1.4 m/sec according to the predetermined CD standard, and CD is required to have a recording time of 74 minutes at longest at a track pitch of 1.6 $\mu$m using a signal-recording area within a region between an inner diameter of 46 mm and an outer diameter of 117 mm.

The audio CD is widely used at present as described above. Therefore, commercially available CD players for reproducing information from the audio CD are also widely used, so that the audio CD has been reduced in the manufacturing cost in virtue of mass production and improved also in the quality similarly.

Information recording media of DRAW-type (Direct Read After Write-type) or WO (Write Once) which can be written (recorded) with information have been developed and some of them are put into practical use. The information recording medium (i.e., optical disc) of DRAW-type basically comprises a disc-shaped substrate made of a plastic material or a glass material and a recording layer made of a metal such as Bi, Sn, In and Te, a semi-metal or a dye, which is provided on the substrate. Recording of information on the optical disc can be carried out by irradiating the disc with a laser beam. The irradiated area of the recording layer of the optical disc absorbs energy of the laser beam and rise of temperature locally occurs, and as a result, a chemical or physical change (e.g., formation of pits) is caused to alter (or change) optical characteristics of the recording layer in the irradiated area, whereby information is recorded on the recording layer. Reading (i.e., reproduction) of information from the optical disc is also carried out by irradiating the disc with a laser beam, that is, the recorded information is reproduced by detecting a reflected light or a transmitted light corresponding to the change in the optical characteristics of the recording layer.

Irradiation of the optical disc with a laser beam for recording and reproducing information is generally made on the predetermined area of the disc surface. In order to accurately track the predetermined area for the irradiation by guiding the laser beam, the surface of the substrate is generally provided with a pregroove (i.e., tracking guide) of depressed shape. The pregroove generally consists of a single groove in the form of spiral or a set of plural grooves in the form of circle.

Further, there has been proposed an information recording medium having an inner ROM area (prepit area having prepits) which are previously formed on the substrate, and an outer recording area provided with the above-mentioned pregroove on which pits for reproducing information data are to be formed by irradiation with a laser beam (see: Japanese Patent Provisional Publication 2(1990)-42652). In this information recording medium, a dye layer for recording the desired information is provided on the outer recording area, while the dye layer is not provided on the prepit area. In other words, the information recording medium is provided with a dye layer only on the recording area and not provided with the dye layer on the prepit area (i.e., ROM area). Hence, there is a boundary between the area where the dye layer is provided and the area where the dye layer is not provided. That is, the boundary is formed at the inner periphery portion of the dye layer. When a pick-up generating a laser beam passes over the inner periphery portion of the dye layer, tracking error or focusing error occurs owing to great variation of reflectance on the periphery portion. Further, when the dye layer is formed, a thickness of the dye layer at the periphery portion increase, the shape of the periphery does not become a concentric circle and therefore the shape apt to become ununiform.

SUMMARY OF THE INVENTION

The present inventors have studied to obtain a information recording medium which is essentially free from the variation of reflectance derived from the boundary (at the inner periphery portion of the dye layer). As a result, a dye layer is continuously formed on both a prepit area and a pregroove area in such a manner that the resulting prepit area shows a modulation degree of not less than 50%, whereby the above problems have been solved. Further, in the conventional information recording medium, a modulation degree in the pregroove area has also been not sufficiently high. Then, by forming the dye layer on the pregroove in the same manner as that of the prepit area, the signal recorded on the pregroove area have been reproduced with a high modulation degree.

It is an object of the present invention to provide an information recording medium provided with a prepit area and a pregroove area in which tracking error or focusing error hardly occurs when a laser beam passes over the boundary (at the inner periphery portion of the dye layer).

It is another object of the invention to provide a process for advantageously preparing an information recording medium having the above-described excellent characteristics.

There is provided by the invention an information recording medium comprising a disc-shaped substrate provided with a prepit area containing prepits and a pregroove area containing a pregroove, a dye layer which is provided on the substrate, said dye layer being a layer for record ing information by forming reproducing pits thereon under irradiation with a laser beam, and a reflecting layer made of a metal which is further provided on the dye layer, wherein the dye layer is a continuous layer formed on both the prepit area and the pregroove area, and the prepit area has a high modulation degree not less than 50%.

In the invention, modulation degree of the prepit area is defined in the following manner.

The modulation degree (C) is determined from the maximum intensity and the minimum intensity of the reproducing signal by the following formula:

$$C = \frac{SH - SL}{SH} \times 100$$

wherein SH is the maximum intensity of the signal, and SL is the minimum intensity of the signal.

Preferred embodiments of the information recording medium of the invention are the following information media (A), (B), (C) and (D).

(1) The information recording medium wherein difference between an optical thickness of the dye layer on the bottom portion of each of the prepits and that of the dye layer on the portion between the adjoining prepits is not more than $\lambda/8$. The $\lambda$ being a wavelength of a reproducing laser beam (laser beam to be used for reproduction). This medium is hereafter referred to as "information recording medium (A)".

(2) The information recording medium (A) wherein difference between an optical thickness of the dye layer on the bottom portion of the pregroove and that of the dye layer on a land portion is not more than $\lambda/8$.

(3) The information recording medium (A) wherein difference between an optical thickness of the dye layer on the bottom portion of the prepit and that of the dye layer on the portion between the prepits is not more than $\lambda/8$, $\lambda$ being a wavelength of a reproducing laser beam; and difference between an optical thickness of the dye layer on the bottom portion of the pregroove and that of the dye layer on a land portion is not more than $\lambda/8$.

(4) The information recording medium (A) wherein a difference between an optical thickness of the dye layer on the bottom portion of the prepit and that of the dye layer on the portion between the prepits is not more than $\lambda/16$.

(5) The information recording medium (A) wherein the thickness of the dye layer on the land portion and the portion between the prepits is in the range of 40 to 400 nm.

(6) The information recording medium (A) wherein the pregroove has a half width of 0.2 to 1.4 μm and a depth of 5 to 70 nm.

(7) The information recording medium (A) wherein the prepit has a half width of 0.2 to 1.4 μm and a depth of 60 to 300 nm.

(8) The information recording medium (A) wherein the depth of the pregroove is shorter than the depth of the prepit by not less than $\lambda/16$ in terms of optical path.

(9) The information recording medium (A) wherein a ratio of the reflectance of the bottom portion of the pregroove to the reflectance of the mirror portion is not less than 70%.

(10) The information recording medium wherein each of the prepits has a half width of 0.2 to 1.4 μm and a depth of 150 to 400 nm, and the total optical path of an optical path of the substrate and that of the dye layer on the bottom portion of each of the prepits is longer than the total optical path of an optical path of the substrate and that of the dye layer on the portion between the prepits by not less than $\lambda/8$. This medium hereafter is referred to as "information recording medium (B)".

(11) The information recording medium (B) wherein each of the prepits has a half width of 0.2 to 1.4 μm and a depth of 150 to 400 nm; the pregroove has a half width of 0.2 to 1.4 μm and a depth of 70 to 200 nm; the depth of each of the prepits is larger than the depth of the pregroove by not less than $\lambda/8$ in terms of optical path; and the total optical path of an optical path of the substrate and that of the dye layer on the bottom portion of each of the prepits is longer than the total optical path of an optical path of the substrate and that of the dye layer on the portion between the prepits by not less than $\lambda/8$.

(12) The information recording medium (B) wherein a half width of each of the prepits is in the range of 0.3 to 1.0 μm, particularly in the range of 0.35 to 0.7 μm.

(13) The information recording medium (B) wherein a depth of each of the prepits is in the range of 160 to 350 nm, particularly 170 to 300 nm.

(14) The information recording medium (B) wherein a half width of the pregroove is in the range of 0.3 to 1.0 μm, particularly in the range of 0.35 to 0.7 μm.

(15) The information recording medium (B) wherein a depth of the pregroove is in the range of 80 to 180 nm, particularly 90 to 160 nm.

(16) The information recording medium (B) wherein the total optical path of an optical path of the substrate and that of the dye layer on the bottom portion of each of the prepits is longer than the total optical path of an optical path of the substrate and that of the dye layer on the portion between the prepits by not less than $\lambda/4$.

(17) The information recording medium (B) wherein the thickness of the portion between prepits is in the range of 40 to 400 nm.

(18) The information recording medium wherein the relationship between a depth of each of the prepits and thickness of the dye layer in the prepit area satisfies the following formula (I):

$$0.15\lambda \leq n_s d_p - n_d \Delta t_p \leq 0.24\lambda \quad (I)$$

and the relationship between a depth of the pregroove and thickness of the dye layer in the pregroove area satisfies the following formula (II):

$$0.02\lambda \leq n_s d_g - n_d \Delta t_g \leq 0.08\lambda \quad (II)$$

in which $n_s$ represents a refractive index of the substrate, $n_d$ represents a refractive index of the dye layer, $d_p$ represents a depth of each of the prepits, $\Delta t_p$ represents difference between thickness of the dye layer on the bottom portion of each of the prepits and that of the dye layer on the portion between the adjoining prepits, $d_g$ represents a depth of the pregroove, $\Delta t_g$ represents difference between thickness of the dye layer on the bottom portion of the pregroove and that of the dye layer on a land portion, and $\lambda$ represents a wavelength of a reproducing laser beam. This medium is hereafter referred to as "information recording medium (C)".

(19) The information recording medium (C) wherein the formula (I) is represented by the following formula (III):

$$0.1\lambda \leq n_s d_p - n_d \Delta t_p \leq 0.22\lambda \quad \text{(III)}$$

in which $n_s$, $d_p$, $n_d$, $\Delta t_p$ and $\lambda$ are the same as defined above.

(20) The information recording medium (C) wherein the formula (II) is represented by the following formula (IV):

$$0.03\lambda \leq n_s d_g - n_d \Delta t_g \leq 0.06\lambda \quad \text{(IV)}$$

in which $n_s$, $d_q$, $n_d$, $\Delta t_q$ and $\lambda$ are the same as defined above.

(21) The information recording medium wherein the prepit area is divided into two areas which are arranged in both sides of the pregroove area. This medium is hereafter referred to as "information recording medium (D)".

(22) The information recording medium (D) wherein the pregroove area is divided into two areas which are arranged in both sides of the prepit area.

(23) The information recording medium (D) wherein the prepit area and the pregroove area both are divided into two more areas, respectively, and the divided prepit areas and pregroove areas are arranged in side by side.

(24) The information recording medium (D) wherein difference between an optical thickness of the dye layer on the bottom portion of each of the prepits and that of the dye layer on the portion between the prepits is not more than $\lambda/8$, and difference between an optical thickness of the dye layer on the bottom portion of a pregroove and that of the dye layer on a land portion is not more than $\lambda/8$.

(25) The information recording medium (D) wherein each of the prepits has a half width of 0.2 to 1.4 $\mu$m and a depth of 150 to 400 nm; the pregroove has a half-depth width of 0.2 to 1.4 $\mu$m and a depth of 70 to 200 nm; the depth of the prepit is larger than the depth of the pregroove by not less than $\lambda/8$ in terms of optical path; and the total optical path of an optical path of the substrate and that of the dye layer on the bottom portion of each of the prepits is longer than the total optical path of an optical path of the substrate and that of the dye layer on the portion between prepits by not less than $\lambda/8$.

There is further provided by the invention a process for the preparation of an information recording medium comprising the steps of:

coating a substrate provided with a prepit area containing prepits and a pregroove area containing a pregroove with a dye solution having a concentration limit of 99 to 20% prepared by dissolving a dye in a solvent by means of spin coating, the concentration limit being defined as a ratio of a volume of a dye suspension when the dye of the dye solution starts to precipitate through evaporation of the solvent from the dye solution at the coating temperature to an initial volume of the dye solution;

drying the coated layer to form a dye layer in which a difference between an optical thickness of the dye layer on the bottom portion of the prepit and that of the dye layer on the area between the prepits is not more than $\lambda/8$ when the substrate is provided with the prepits, $\lambda$ being a wavelength of a reproducing laser beam; and then providing a reflecting layer made of a metal on the dye layer.

Preferred embodiments of the process for the preparation of an information recording medium according to the invention are as follows:

(1) The process for the preparation of an information recording medium wherein the dye layer is provided such a manner that difference between an optical thickness of the dye layer on the bottom portion of the pregroove and that of the dye layer on the land portion is not more than $\lambda/8$, $\lambda$ being a wavelength of a reproducing laser beam.

(2) The process for the preparation of an information recording medium wherein the dye layer is provided such a manner that difference between an optical thickness of the dye layer on the bottom portion of the pregroove and that of the dye layer on the land portion is not more than $\lambda/16$.

(3) The process for the preparation of an information recording medium wherein the dye layer is provided such a manner that difference between an optical thickness of the dye layer on the bottom portion of the prepit and that of the dye layer on the portion between the prepits is not more than $\lambda/16$.

(4) The process for the preparation of an information recording medium wherein a thickness of the dye layer on the land potion and the portion between the prepits is in the range of 40 to 400 nm.

(5) The process for the preparation of an information recording medium wherein the pregroove has a half width of 0.2 to 1.4 $\mu$m and a depth of 5 to 70 nm.

(6) The process for the preparation of an information recording medium wherein each of the prepits has a half width of 0.2 to 1.4 $\mu$m and a depth of 60 to 300 nm.

(7) The process for the preparation of an information recording medium wherein the depth of the pregroove is shorter than the depth of the prepit by not less than $\lambda/16$ in terms of optical path.

(8) The process for the preparation of an information recording medium wherein the concentration limit of the dye solution is in the range of 90 to 50%.

(9) The process for the preparation of an information recording medium wherein the solvent is a single solvent.

(10) The process for the preparation of an information recording medium wherein the solvent is a mixture of a good solvent for a used dye (preferably a solvent capable of dissolving the used dye in an amount of not less than 2 wt. % at a coating temperature) and a poor solvent for the used dye having compatibility with the good solvent (preferably a solvent not dissolving the used dye in an amount of not less than 2 wt. % at a coating temperature).

(11) The process for the preparation of an information recording medium wherein a concentration of the dye in the dye solution is in the rang of 0.5 to 15 wt. %.

(12) The process for the preparation of an information recording medium wherein the dye solution is coated on the substrate under rotation of the substrate at 300 to 10,000 r.p.m. at a temperature of 0° to 100° C.

In the information recording medium of the invention having both of a prepit area and a pregroove area on a substrate, the dye layer is formed continuously on both the pregroove area and the prepit area, and the dye layer on the prepit area is so formed as to exhibit a modulation degree of not less than 50%. Therefore, any edge portion of the dye layer is not present at the boundary area (gap) between the prepit area and the pregroove area, so that the aforementioned problem such as tracking error or focusing error hardly occurs.

Further, the signal reproduced from the medium shows high modulation degree and high reflectance and satisfies CD standard in the prepit area. Thus, the information recording medium shows very excellent characteristics.

In addition, a dye layer is formed on both a prepit area where prepits have been formed and a recording area (a pregroove area) where a pregroove has been form, and the signal produced from the prepit area satisfies CD standard. Accordingly, the information recording medium of the invention may be applied to a wide variety of uses without limitation on the kind of application software system and utilization thereof.

Particularly, in the information recording medium (A) of the embodiment according to the present invention, difference between an optical thickness of the dye layer on the bottom portion of the prepit and that of the dye layer on the portion between the prepits is small, so that the depth of a depression on the surface of the dye layer is sufficiently large even when the depth of the prepit is made small. Further, difference between an optical thickness of the dye layer on the bottom portion of the pregroove and that of the dye layer on the land portion is small, so that the depth of a depression on the surface of the dye layer is sufficiently large even when the depth of the pregroove is made small. Accordingly, there can be obtained reproduced signal showing high modulation degree of not less than 50% and high reflectance and satisfying CD standard in both the prepit area and the pregroove area after the medium is irradiated with a laser beam to record information thereon, and the medium is excellent in the tracking properties. Thus, the information recording medium shows very excellent characteristics.

Moreover, in the case that the information recording medium (B) of the embodiment according to the invention has both of a prepit area and a pregroove area, the dye layer is formed continuously on both the prepit area and the pregroove area. Therefore, the signal reproduced from the prepit area and a pregroove area recording medium shows the similar excellent effects as those of the medium (A). Further, the information recording medium (B) of the invention is provided with prepits of specific shape, so that the medium can be easily prepared by forming a dye layer on the substrate utilizing conventional methods.

In the other hand, the information recording medium (C) of the embodiment according to the invention is prepared such a manner that the relationship between the depth of the prepit and the thickness of a dye layer in the prepit area and a relationship between the depth of the pregroove and the thickness of the dye layer in the pregroove area satisfies the above specific conditions (formulae (I) and (II)). Such information recording medium is can be easily prepared and exhibits a high modulation degree of not less than 50%, a high reflectance and excellent tracking property.

In more detail, in the case of using a substrate having a new format, depths of its prepit and pregroove are substituted into the above formulae to obtain thicknesses of a dye layer appropriate for the new substrate, whereby a medium having a high modulation degree and reflectance can be easily prepared. In the case that thicknesses of a dye layer formed on a pregroove and prepit using a dye solution is known, the thicknesses are substituted into the above formulae to obtain depths of prepit and pregroove appropriate for the dye solution, whereby a medium having a high modulation degree and reflectance can be easily prepared, too.

Furthermore, the information recording medium (D) of the embodiment according to the present invention has the features of above-mentioned media, so that the medium is a disc of CD compatible type capable of being additionally recorded with information, and shows such prominently excellent effects that applicable embodiments and applicable fields can be extremely widened, a burden of a hardware system can be mitigated and the medium can be easily and efficiently prepared.

In more detail, the information recording medium (D) has a plurality of prepit areas and pregroove areas provided separately, so that the medium shows various effects. For example, an access time can be shortened because the access distance of a pick-up is short; gap-controlling is unnecessary; troublesome controlling for accurately coating a dye solution from a gap area whose position varies depending on the number or size of the title program is unnecessary during the procedure for forming a dye layer in the preparation of the optical disc; variation of reflectance is very little all over the disc, so that a burden of a hardware system can be mitigated; the number of copy procedures can be restricted; the recording area can be enlarged; and all procedures can be done in the area having continuous optical characteristics, so that a burden of a hardware system can be mitigated.

The process for advantageously preparing an information recording medium according to the invention shows such an excellent effect that the process can easily prepare an information recording medium having the above-mentioned excellent characteristics utilizing the same means as that conventionally employed excepting a use of a solution for forming a dye layer having specific properties which is prepared under control of a kind of a solvent and a concentration of a dye.

DETAILED DESCRIPTION OF THE INVENTION

Figure 1:
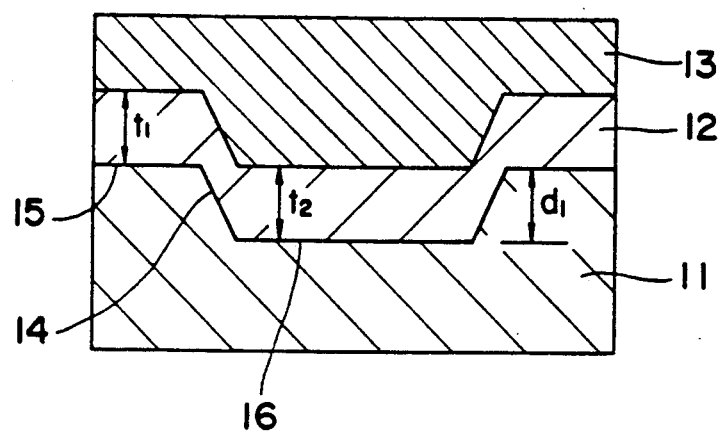
FIG. 1 is a sectional view schematically showing a part of a section of one example of the information recording medium (A) according to the invention at the prepit area.

The information recording medium of the invention has a basic structure comprising a substrate provided with a pregroove area containing a pregroove and a prepit area containing prepits, a dye layer and a reflecting layer made of a metal, provided in this order. Further, the dye layer is a continuous layer formed on both the prepit area and the pregroove area, and the prepit area has a high modulation degree not less than 50% (preferably not less than 60%).

As embodiments of the information recording medium in which the prepit area shows a modulation degree of not less than 50%, there are mentioned the information recording media (A), (B), (C) and (D) as described above.

At first, the information recording medium (A) is prepared in the following manner.

A material of the disc-shaped substrate employable in the invention can be selected from any materials which have been employed for substrates of the conventional information recording media. Examples of the substrate materials include glasses, acrylic resins (e.g., polymethyl methacrylate), vinyl chloride resins (e.g., polyvinyl chloride and vinyl chloride copolymer), epoxy resins, polycarbonate resins, amorphous polyolefins and polyesters. From the viewpoints of optical characteristics, surface smoothness, processing properties, handling properties, stability with time and manufacturing cost, preferred are polycarbonate, polyolefin, glass and polymethyl methacrylate.

On the surface of the substrate where the dye layer is to be provided, an undercoat layer may be provided to improve surface smoothness of the substrate, to enhance adhesion between the substrate and the recording layer, to improve resistance of the substrate to solvents and to prevent denaturing of the recording layer. Examples of materials for the undercoat layer include polymer materials such as polymethyl methacrylate, acrylic acid/methacrylic acid copolymer, styrene/maleic anhydride copolymer, polyvinyl alcohol, N-methylol acrylamide, styrene/sulfonic acid copolymer, styrene/vinyl toluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, polyethylene, polypropylene, polycarbonate and epoxy resin; organic materials such as silane coupling agent and titanate coupling agent; and inorganic materials such as inorganic derivative (e.g., $SiO_2$, $ZnS$, $AlN$ and $Si_3N_4$) and inorganic fluoride (e.g., $MgF_2$).

The undercoat layer can be formed on the substrate, for example, by dissolving or dispersing the above-mentioned material in an appropriate solvent to prepare a coating solution or dispersion, and applying the coating solution or dispersion to the surface of the substrate using known coating methods such as spin coating, dip coating and extrusion coating. The thickness of the undercoat layer is generally in the range of 0.005 to 20 μm, preferably in the range of 0.01 to 10 μm.

In the invention, the surface of the substrate (or surface of the undercoat layer) is provided with a pregrrove (tracking groove) for the purpose of favorably conducting tracking in the recording or reproducing stage. Further, the surface of the substrate (or surface of the undercoat layer) is provided with prepits (prepit area) where various information such as information of application software systems and address signal has been beforehand recorded.

In the information recording medium (A), each of the prepits has a shape preferably having a depth (i.e., $d_1$ in FIG. 1 of the attached drawings) in the range of 60 to 300 nm and a half width (i.e., width of prepit at the depth of ½ of a depth of prepit) in the range of 0.2 to 1.4 μm, more preferably a depth of prepit in the range of 70 to 250 nm and a half width of prepit in the range of 0.3 to 1.0 μm, most preferably a depth of prepit in the range of 90 to 200 nm and a half width of prepit in the range of 0.4 to 0.7 μm.

The pregroove has a shape preferably having a depth (i.e., $d_2$ in FIG. 2 of the attached drawings) in the range of 5 to 70 nm and a half width (i.e., width of pregroove at the depth of ½ of a depth of pregroove) in the range of 0.2 to 1.4 μm, more preferably a depth of pregroove in the range of 15 to 60 nm and a half width of pregroove in the range of 0.3 to 0.7 μm, most preferably a depth of pregroove in the range of 20 to 50 nm and a half width of groove in the range of 0.35 to 0.6 μm. The pregroove may be subjected to wobbling for the purpose of addressing or controlling a linear speed.

The depth of the pregroove is preferably shorter than the depth of each of the prepits by not less than λ/16 (λ means a wavelength of a reproducing laser beam, and has the same meaning hereinafter) in terms of optical path, more preferably shorter by not less than λ/14, most preferably shorter by not less than λ/12. The reason is that if the depth of the pregroove is made the same as that of the prepit which has sufficiently high modulation degree, the reflectance of the pregroove becomes too low.

If the substrate material is plastic, it is preferred to form the pregroove or the pregroove and the prepits directly on the surface of the substrate by subjecting the material to injection molding, extrusion molding or the like. Further, a pregroove layer for forming the pregroove and the prepits may be provided on the surface of the substrate.

As materials of the pregroove layer, there can be employed a mixture of at least one monomer (or oligomer) selected from the group consisting of monoester, diester, triester and tetraester of an acrylic acid and a photopolymerization initiator.

The pregroove layer can be formed on the substrate by the process described below. In the first place, a mixture liquid of an acrylic acid ester and a photopolymerization initiator is coated on a precisely prepared stamper, and on the coated layer of the liquid is placed a substrate. Then, the coated layer is cured under irradiation with ultraviolet rays via the substrate or the stamper so as to fix the substrate to the coated layer. Thereafter, the substrate is separated from the stamper. Thus, a substrate provided with a pregroove layer can be prepared. The thickness of the pregroove layer is generally in the range of 0.1 to 100 μm, preferably in the range of 0.1 to 50 μm.

On the substrate provided with the pregroove and the prepits (or on the pregroove layer), a solvent-resistant layer may be provided using the same material as that for the aforementioned undercoat layer to protect the substrate from a solvent contained in a coating solution for the formation of a dye layer.

A dye layer is provided on the substrate or the undercoat layer. The information recording medium is irradiated with a laser beam from the substrate side to form reproducing pits on the dye layer, whereby information is recorded on the dye layer. Accordingly, the dye layer formed on the pregroove area of the substrate serves as a recording layer.

There is no specific limitation on the dye employable in the invention, and any dyes can be employed. Examples of the dyes include cyanine dyes, phthalocyanine dyes, naphthalocyanine dyes, pyrrilium dyes, thiopyrrilium dyes, azulenium dyes, squalilium dyes, metal complex dyes (e.g., Ni and Cr), naphthoquinone dyes, anthraquinone dyes, indophenol dyes, indoaniline dyes, triphenylmethane dyes, triallymethane dyes, aminium dyes, diinmonium dyes, nitroso dyes, leuco dyes and chloconium dyes.

These dyes may be of either a WO (Write Once) type (i.e., DRAW type) or a RW (Rewritable) type (i.e., a reversible type).

Preferred are dyes having high absorption for a light within near infrared region of 700 to 900 nm, because a semi-conductor laser releasing near infrared rays is practically utilized as a recording and reproducing laser.

Particularly, cyanine dyes, azulenium dyes and squalilium dyes are preferred, and among the cyanine dyes, naphthoindolenine dyes and imidazoquinoxaline dyes are preferred.

These dyes may be employed singly or in combination. In the case of using a cyanine dye, it is preferred to use the above-mentioned metal complex dye, aminium dye or diinmonium dye as a quencher in combination with the cyanine dye. In this case, the metal complex dye or the like is used as a quencher preferably in an amount of 0.001 to 0.3 mole per 1 mole of the total amount of the dyes.

The information recording medium (A) of the embodiment is characterized in that a difference between the optical thickness of the dye layer on the bottom portion of each of the prepits and the optical thickness of the dye layer on the portion between the prepits is not more than $\lambda/8$, in a prepit area. The information recording medium (A) preferably has a pregroove area characterized in that a difference between the optical thickness of the dye layer on the bottom portion of each of the pregroove and the optical thickness of the dye layer on the land portion is not more than $\lambda/8$. Such thicknesses of the dye layer result in a high modulation degree of not less than 50%.

The optical thickness of the dye layer in the above information recording medium (A) is described in detail hereinafter referring to the attached drawings.

Figure 2:
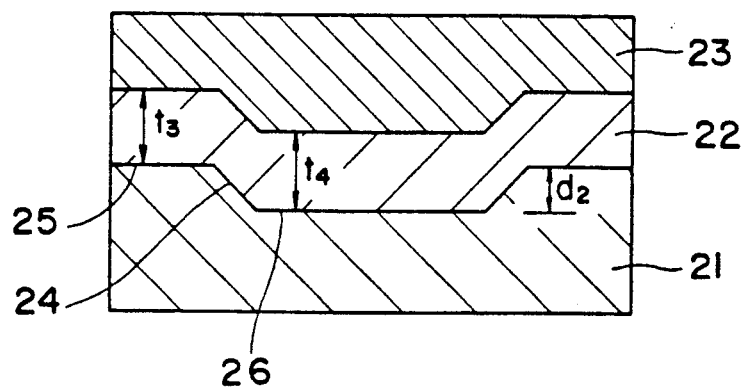
FIG. 2 is a sectional view schematically showing a part of a section of one example of the information recording medium (A) according to the invention at the pregroove area.
Figure 3:
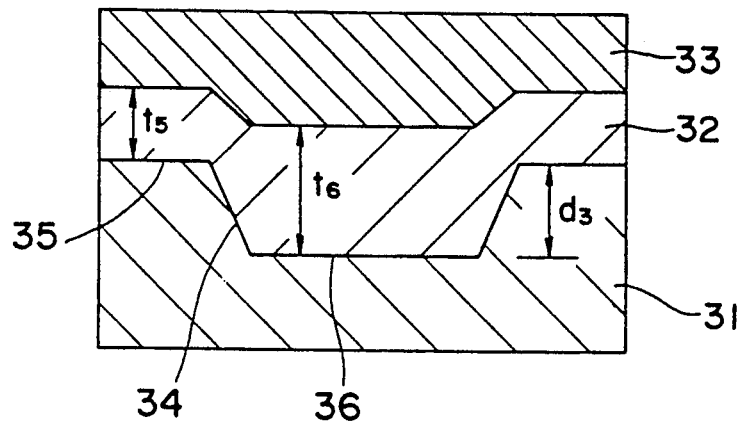
FIG. 3 is a sectional view schematically showing a part of a section of a conventional information recording medium at the prepit area.

FIG. 1 is a sectional view schematically illustrating a part of a section of one example of the information recording medium (A) according to the invention at the prepit area. FIG. 2 is a sectional view schematically illustrating a part of a section of one example of the information recording medium (A) according to the invention at the pregroove area. FIG. 3 is a sectional view schematically illustrating a part of a section of a conventional information recording medium at the pregroove area.

In FIG. 3, on a surface of a substrate 31 made of plastic is formed a dye layer 32 made of a dye, and on the dye layer 32 is formed a reflecting layer 33 made of a metal. The substrate 31 is provided with a prepit 34. The dye layer 32 is a layer prepared by coating a solution for the formation of a dye layer having been prepared by dissolving a dye in a solvent onto the substrate through spin coating and drying the coated layer. The thickness $t_6$ of the dye layer 32 on a bottom portion 36 of the prepit 34 is larger than the thickness $t_5$ of the dye layer 32 on a portion 35 between the prepits of the substrate 31. As a result, the depth of a depression (pit shaped portion) on the interface between the dye layer 32 and the reflecting layer 33 becomes smaller than the depth $d_3$ of the prepit 34. Hence, there arises such a problem that a phase difference between the upper part of the depression (prepit) of the dye layer 32 and the bottom part thereof becomes smaller, whereby the modulation degrees of the prepits become low.

In the case that the dye layer is formed in the same manner as the above on a pregroove area instead of the prepit area, there arises the similar problem. That is, when a recording pit is formed on the pregroove under irradiation with a laser beam to record information, a phase difference between the upper part (corresponding to the land portion of the substrate) of the depression of the dye layer and the bottom part thereof becomes smaller, whereby the modulation degrees of the recording pits become low. For coping with this problem, the depth of the prepit or pregroove is conventionally made large. However, if the depth of the prepit or pregroove, especially pregroove, is made too large, the reflectance of the pregroove portion decreases.

In FIG. 1, on a surface of a substrate 11 made of plastic is formed a dye layer 12 made of a dye, and on the dye layer 12 is formed a reflecting layer 13 made of a metal. The substrate 11 is provided with a prepit 14. The dye layer 12 is a layer prepared by coating a solution for the formation of a dye layer having a specific property which has been prepared by dissolving a dye in a solvent onto the substrate through spin coating and drying the coated solution. A method for preparation of the above dye solution is hereinafter described. A difference between the optical thickness ($n_r t_2$) of the dye layer 12 on a bottom portion 16 of the prepit 14, that is, $n_r t_2$ ($n_r$ is a refractive index of the dye layer and $t_2$ is a thickness of the dye layer 12 on the bottom portion 16), and the optical thickness ($n_r t_1$) of the dye layer 12 on the portion 15 between the prepit and its adjoining prepit of the substrate 11, that is, $n_r t_1$ ($n_r$ is a refractive index of the dye layer and $t_1$ is a thickness of the dye layer 12 on the portion 15 between prepits), is not more than $\lambda/8$. As a result, the depth of a depression on the interface between the dye layer 12 and the reflecting layer 13 is made the same as the depth $d_1$ of the prepit 14 or smaller than the depth $d_1$ of the prepit 14 by approx. not more than $\lambda/8$ in terms of optical thickness, and therefore a phase difference between the surface of the dye layer 12 on the bottom portion of the prepit and that of the dye layer 12 on the portion between the prepits is large, resulting in high modulation degree of the prepits. Therefore, even if the dye layer is formed on the prepit area of the substrate, the prepits of the substrate can be reproduced with a high modulation degree of not less than 50%.

Difference between $n_r t_1$ and $n_r t_2$ is preferably not more than $\lambda/11$, more preferably not more than $\lambda/13$, most preferably not more than $\lambda/16$.

In FIG. 2, on a surface of a substrate 21 made of plastic is formed a dye layer 22 made of a dye, and on the dye layer 22 is formed a reflecting layer 23 made of a metal. The substrate 21 is provided with a pregroove 24. The dye layer 22 is a layer prepared by coating a solution for the formation of a dye layer having the above specific property on the substrate through spin coating and drying the coated solution. A difference between the optical thickness ($n_r t_4$) of the dye layer 22 on a bottom portion 26 of the pregroove 24, that is, $n_r t_4$ ($n_r$ is a refractive index of the dye layer and $t_4$ is a thickness of the dye layer 22 on the bottom portion 26), and the optical thickness ($n_r t_3$) of the dye layer 22 on a land portion 25 of the substrate 21, that is, $n_r t_3$ ($n_r$ is a refractive index of the dye layer and $t_3$ is a thickness of the dye layer 22 on the land portion 25), is not more than $\lambda/8$. As a result, the depth of a depression (groove-shaped portion) on the interface between the dye layer 22 and the reflecting layer 23 is the same as the depth $d_2$ of the pregroove 24 or smaller than the depth $d_2$ of the pregroove 24 by approx. not more than $\lambda/8$ in terms of optical thickness, and therefore a phase difference between the surface of the dye layer 22 on the bottom portion and that of the dye layer 22 on the land portion is large, resulting in high modulation degree of the recording pits. When difference between $n_r t_3$ and $n_r t_4$ is made as mentioned above, the depth $d_3$ of the pregroove 24 can be made small, and thereby the reflectance of the groove portion increases.

Difference between $n_r t_3$ and $n_r t_4$ is preferably not more than $\lambda/11$, more preferably not more than $\lambda/13$, most preferably not more than $\lambda/16$.

A ratio of the reflectance of the bottom portion of the pregroove to that of the mirror portion is preferably not less than 70%, more preferably not less than 80%, most preferably not less than 90%. For increasing the ratio of the reflectance of the bottom portion to that of the mirror portion, it is generally effective that a difference between the optical path of the bottom portion and the optical path of the land portion is made small.

In the information recording medium (A), a reflecting layer is further formed on the above-mentioned dye layer, but the effect given by the formation of the dye layer having specific relationship in the optical path as described above is also brought about an information recording medium without a reflecting layer.

In the relationship between the pregroove and the prepit, the depth $d_1$ of the pregroove is smaller than the depth of $d_2$ of the prepit preferably by not less than $\lambda/16$, more preferably by not less than $\lambda/14$, most preferably by not less than $\lambda/12$, in terms of optical path ($n \cdot d$: n is a refractive index of the substrate and d is a depth thereof).

The thickness of the dye layer on the land portion and on the portion between the prepits is preferably in the range of 40 to 400 nm, more preferably in the range of 60 to 300 nm, most preferably in the range of 80 to 250 nm.

The dye layer having specific optical path in the information recording medium (A), that is, a dye layer having such specific optical thickness that difference between the optical thickness of the dye layer on the bottom portion of the pregroove and the optical thickness of the dye layer on the land portion is not more than $\lambda/8$, and/or difference between the optical thickness of the dye layer on the bottom portion of the prepit and the optical thickness of the dye layer on the portion between prepits is not more than $\lambda/8$, can be prepared by a process for the preparation of the information recording medium of the invention.

In the process of the invention, the formation of the dye layer is conducted by dissolving the aforementioned dye in a solvent to prepare a dye solution, then coating the dye solution over the surface of the substrate by means of spin coating and drying the coated layer of the dye solution.

The dye solution used in the process of the invention is a dye solution having specific property, that is, the dye solution has a concentration limit of 99 to 20%. In this specification, the terms "concentration limit" are defined as a ratio of a volume of a dye suspension when the dye of the dye solution starts to precipitate through evaporation of the solvent from the dye solution at the coating temperature to an initial volume of the dye solution. For example, when a dye solution prepared by dissolving a dye in a solvent is kept at a coating temperature for forming a dye layer to evaporate the solvent from the dye solution, the volume of the dye solution decreases in accordance with the evaporation of the solvent, and the dye contained in the dye solution soon comes to be precipitated. A dye solution in which the volume of the dye solution (dye suspension in a strict sense of the word) when the dye starts to precipitate is 90% of the volume of the initial dye solution, is referred to a dye solution of a concentration limit of 90%.

Accordingly, the concentration limit of the dye solution varies depending on various conditions such as combination of a dye and a solvent (single solvent or mixture solvent), kinds and ratio of solvents when two or more solvents are used, dye concentration in the dye solution and a coating temperature. Therefore, a specific concentration limit of a dye solution cannot be determined for a specific dye in the same rule. However, a dye solution having a desired concentration limit can be easily prepared by the skilled in the art by way of varying the above-mentioned conditions.

The dye solution used in the process of the invention generally has a concentration limit of 99 to 20%, preferably 99 to 30%, more preferably 95 to 40%, most preferably 90 to 50%. When the concentration limit of the dye solution is more than the upper limit of the above-mentioned range, the thickness of the dye layer becomes ununiform. When the concentration limit of the dye solution is less than the lower limit of the above-mentioned range, difference between the optical thickness of the dye layer on the bottom portion of a pregroove and that of the dye layer on the land portion, or both the above difference and difference between the optical thickness of the dye layer on the bottom portion of a prepit and that of the dye layer on the portion between prepits, becomes larger.

The solvent used for preparing the above-mentioned dye solution may be either a single solvent or a mixture solvent of two or more kinds, provided that the solvent satisfies the concentration limit of the dye solution. When the solvent is a mixture solvent, the mixture solvent is preferably a mixture of a good solvent for the used dye (preferably a solvent capable of dissolving the used dye in an amount of not less than 2 wt. % at a coating temperature) and a poor solvent for the used dye (preferably a solvent not dissolving the used dye in an amount of not less than 2 wt. % at a coating temperature). In this case, it is required that the good solvent and the poor solvent are compatible with each other, and the evaporation speed of the poor solvent is not higher than the evaporation speed of the good solvent at the coating temperature. As the amount of the poor solvent increases, the concentration limit generally becomes larger.

Examples of the solvents include aromatic hydrocarbon solvents such as benzene, toluene, xylene and ethyl benzene; aliphatic hydrocarbon solvents such as hexane, octane, nonane and cyclohexane; organic acid solvents such as acetic acid; ester solvents such as ethyl acetate, butyl acetate, amyl acetate, and ethylene glycol monoethyl ether acetate (cellosolve acetate); ketone solvents such as acetone, methyl ethyl ketone, methyl isobutyl ketone, diisobutyl ketone and cyclohexanone; halogenated hydrocarbon solvents such as dichloromethane, 1,2-dichloroethane, chloroform, methyl chloroform, trichloroethylene (trichlene), carbon tetrachloride and tetrachloroethylene; ether solvents such as tetrahydrofuran, ethyl ether, isopropyl ether, dioxane and daigrime; alcohol solvents such as ethanol, n-propanol, iso-propanol, n-butanol, amyl alcohol, diacetone alcohol, ethylene glycol monomethyl ether, ethylene glycol monoethyl ether, ethylene glycol monobutyl ether, propylene glycol monomethyl ether and benzyl alcohol; amide solvents such as dimethylformamide; and fluorine-containing solvents such as fluorinated alcohol (e.g., 2,2,3,3-tetrafluoropropanol), fluorine-substituted ketone, foluorine-substituted ester, fluorine-substituted amide, fluorine-substituted ether, fluorine-substituted aromatic hydrocarbon and fluorine-substituted aliphatic hydrocarbon.

The concentration of the dye in the dye solution is not specifically limited in the process of the invention, provided that the dye solution satisfies the above-mentioned concentration limit. However, the concentration of the dye in the dye solution is generaly 0.5 to 15 wt. %, preferably 1 to 10 wt. %, more preferably 1.5 to 8 wt. %, most preferably 1.5 to 5 wt. %, from the viewpoint of convenience in handling thereof and the formation of a dye layer of uniform thickness on the substrate through spin coating.

The coating solution may further contain various additives such as an antioxidant, a UV-absorbent, a plasticizer and a lubricant according to the purpose.

In the case of using a binder, examples of the binders include natural organic polymer materials such as gelatin, dextran, rosin and rubber; and synthetic organic polymer materials such as cellulose derivative (e.g., cellulose acetate and nitrocellulose), hydrocarbon resins (e.g., polyethylene, polypropylene, polystyrene, polyisobutylene and chlorinated polyethylene), vinyl resins (e.g., polyvinyl chloride, polyvinylidene chloride, polyvinyl chloride/polyvinyl acetate copolymer and polyvinyl alcohol), acrylic resins (e.g., polymethyl acrylate and polymethyl methacrylate), and precondensates of thermosetting resins (e.g., epoxy resin, butyral resin, rubber derivative and phenol/formaldehyde resin).

Coating of the above-mentioned dye solution over the substrate by means of spin coating can be conducted utilizing known coating devices and known coating methods. The dye solution is coated over the substrate at a temperature of generally 0° to 100° C., preferably 5° to 80° C., more preferably 10° to 60° C. The rotation of the substrate is carried out at generally 10 to 1,000 r.p.m., preferably 100 to 500 r.p.m., in the case of coating the dye solution over the substrate, and the rotation thereof is carried out at generally 300 to 10,000 r.p.m., preferably 500 to 7,000 r.p.m., more preferably 700 to 4,000 r.p.m., in the case of drying the coated layer of the dye solution.

In the information recording medium (A), an enhancing layer may be provided between the dye layer and a reflecting layer which is optionally provided, to enhance the reflectance.

The material for forming the enhancing layer is preferably a material having a glass transition temperature of 60° to 400° C., preferably 100° to 300° C., more preferably 100° to 250° C.; a melting point of 60° to 500° C., preferably 100° to 400° C., more preferably 100° to 350° C., a boiling point or a decomposition point of 80° to 600° C., preferably 120° to 500° C., more preferably 120° to 450° C.; a refractive index (n) at the wavelength the reproducing laser beam of 1.1 to 1.8, preferably 1.2 to 1.7, more preferably 1.3 to 1.6; and an extinction coefficient (k) of not more than 0.3, preferably not more than 0.1. As the material for forming the enhancing layer, any organic materials and any inorganic materials can be employed, provided that they have the above-described properties.

The enhancing layer can be formed by means of deposition, sputtering, etc. However, it is preferred to form the enhancing layer by coating a solution containing the above-mentioned material and drying the coated solution, because the layer can be formed easily and economically. Accordingly, materials preferably used for forming the enhancing layer are those capable for forming the layer by a coating method, for example, polybutadiene, silicone resins and fluorine-containing resins.

There is no specific limitation on the coating method for forming the enhancing layer, and any conventional coating methods can be employed. For example, a material for forming enhancing layer is dissolved in a solvent to prepare a coating solution, then the solution is coated on the dye layer by means of spin coating or the like, and the coated solution is dried to remove the solvent so as to form the enhancing layer. The thickness (dimensional film-thickness) of the enhancing layer on the bottom portion of the prepit sometimes becomes larger than that of the enhancing layer on the portion between prepits, but even in this case, the optical film-thickness of the enhancing layer on the bottom potion and that of the enhancing layer on the portion between prepits are almost the same, because the refractive index of the enhancing layer is small. In the information recording medium (A), accordingly, the provision of the enhancing layer does not give any adverse effect on reproduction of the prepit signal, and the reflectance can be enhanced.

The enhancing layer preferably has a thickness of 50 to 600 nm both on the bottom portion of the pregroove and the bottom portion of the prepit and a thickness of 50 to 600 nm both on the land portion and the portion between prepits.

In the information recording medium (A) of the invention, a reflecting layer is further provided on the dye layer.

Examples of materials employable for the reflecting layer include metals and semi-metals such as Be, B, C, Sc, Rb, Sr, As, Os, Tl, At, Fr, Ra, Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, Bi and Sb. C, Au, Zn, Cu, Pt, Al, Ni, In and stainless steel are preferred. These materials can be employed singly or in combination. Alloys thereof can be also employed in the invention.

The reflecting layer can be formed on the dye layer, for example, by depositing, sputtering or ion plating the above-mentioned light-reflecting material on the dye layer. Particularly, it is preferred to form the reflecting layer by means of sputtering. The thickness of the reflecting layer is generally in the range of 10 to 300 nm, preferably in the range of 40 to 200 nm.

When a reflecting layer made of precious metal is provided as the reflecting layer, a metal-adherent layer such as an Al-adherent layer or an organic material-adherent layer can be provided thereon.

On the reflecting layer, a protective layer may be provided to physically and chemically protect the whole resulting information recording medium, particularly the dye layer and the reflecting layer. The protective layer may be also provided on the surface of the substrate where the dye layer is not provided, to improve damage resistance and moisture resistance.

As materials of the protective layer, there can be mentioned inorganic materials such as SiO, $SiO_2$, $Si_3N_4$, $MgF_2$ and $SnO_2$ and organic materials such as thermoplastic resins, thermosetting resins and UV-curable resins. UV-curable resins are preferred.

The protective layer can be formed, for example, by dissolving a thermoplastic resin, a thermosetting resin, etc. to prepare a coating solution, then coating the solution over the reflecting layer, and drying the coated layer of the solution. In the case of using a UV-curable resin, the resin per se or a solution of the resin in an appropriate solvent is coated over the reflecting layer, and the coated layer is irradiated with ultraviolet rays to cure the layer so as to form a protective layer. As the UV-curable resin, there can be employed generally known UV-curable resins which are mixtures of oligomers of (meth)acrylates such as urethane (meth)acrylate, epoxy (meth)acrylate, polyester (meth)acrylate, monomers such as (meth)acrylic esters and photoinitiators. The coating solution for the formation of a protective layer may further contain a variety of additives such as an antistatic agent, an antioxidant and a UV-absorbent according to the purpose. Among the above-mentioned materials, UV-curable resin is preferably employed as the material of the protective layer.

The thickness of the protective layer is generally in the range of 0.1 to 100 μm, preferably in the range of 0.5 to 20 μm.

Other than the above-described methods, the protective layer can be formed by a method of laminating a plastic film having been obtained by extrusion processing of a plastic material on the reflecting layer via an adhesive layer. Otherwise, the protective layer can be also formed by depositing or sputtering the above inorganic materials.

Recording of information on the information recording medium (A) of the embodiment according to the invention is conducted by irradiating the bottom portion of the pregroove with a laser beam from the substrate side under rotation of the medium at a fixed linear speed (preferably 1.2-2.8 m/sec, more preferably 1.2-1.4 m/sec) to form reproducing pits on the dye layer existing on the pregroove, so as to record signal thereon. As the signal, EFM signal of CD format is preferably recorded from the viewpoint of obtaining the effects of the invention. As the recording light, a semiconductor laser beam having a wavelength within the region of 500 to 900 nm (preferably 750 to 850 nm) is generally employed. On the information recording medium of the invention, information can be recorded at a laser power of not more than 10 mW.

Under irradiation with a laser beam, the substrate and/or the dye generates a heat and is melted, evaporated, subliminated, deformed or denatured, to bring about change in the shape (e.g., to give depressed shape, wavy shape or protruded shape) between the substrate and the dye, change within the dye layer (e.g., to give a cavity), change (e.g., to give a cavity) between the dye and the metal reflecting layer, etc., whereby pits are formed after the above-mentioned recording procedure.

When CD format signal or the like is recorded on the information recording medium at a fixed linear speed using the above-mentioned recording method, excellent recording and reproducing properties such as high modulation degree of signal and high C/N of the reproduced signal can be obtained. Further, tracking properties in the recording stage, particularly tracking properties by a push-pull method, can be improved. Moreover, since the optical disc has a high reflectance, the recorded CD format signal can be reproduced using a commercially available CD player. Further, reproduced signal of high modulation degree can be also obtained in the prepit area.

Subsequently, the information recording medium (B) of the embodiments according to the invention are described in detail.

The information recording medium (B) has a basic structure comprising a substrate provided with a prepit area containing prepits having a specific shape and a pregroove area containing a pregroove, a dye layer and a reflecting layer, superposed in this order and shows a high modulation degree of not less than 50%. The information recording medium (B) preferably a pregroove area containing a pregroove having a specific shape.

In the information recording medium (B), a surface of the substrate is provided with a prepit area where various information such as audio signal, information on application software systems and address signal has been previously recorded.

As materials of the disc-shaped substrate of the information recording medium (B), there can be employed those described for the disc-shaped substrate of the information recording medium (A).

The prepit of the substrate in the information recording medium (B) is described in detail hereinafter referring to the attached drawing.

Figure 4:
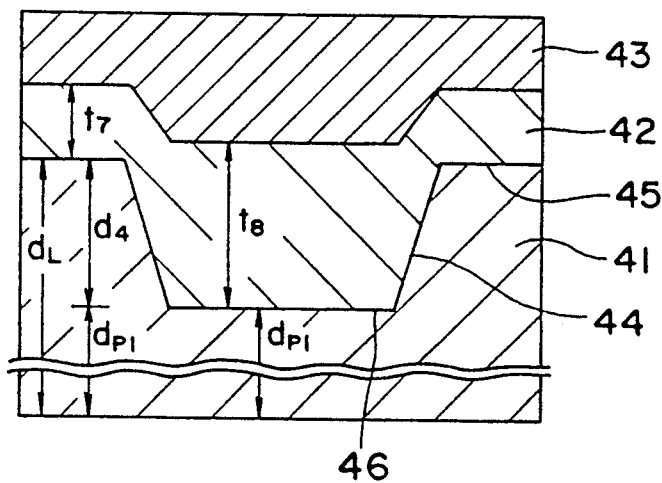
FIG. 4 is a sectional view schematically showing a part of a section of one example of the information recording medium (B) according to the invention at the prepit.

FIG. 4 is a sectional view schematically illustrating a part of a section of one example of the information recording medium (B) at the prepit.

In FIG. 4, on a substrate 41 made of plastic is formed a dye layer 42 made of a dye, and on the dye layer 42 is formed a reflecting layer 43 made of a metal. The substrate 41 is provided with a prepit 44. The dye layer 42 is a layer formed by coating a solution for the formation of a dye layer having been prepared by dissolving a dye in a solvent and drying the coated layer. For the aforementioned reason, the thickness $t_8$ of the dye layer 42 on a bottom portion 46 of the prepit 44 is larger than the thickness $t_7$ of the dye layer 42 on the portion 45 between the prepit 44 and its adjoining prepit of the substrate 41. The total optical path of an optical path of the substrate and that of the dye layer 42 on the bottom portion 46 of the prepit 44 and the total optical path of an optical path of the substrate 41 and that of the dye layer 42 on the portion 45 between the prepit 44 and its adjoining prepit are each determined as follows.

That is, the optical path $OL_{P1}$ on the bottom portion 46 of the prepit 44 is represented by the following formula:

$$OL_{P1} = n_D \cdot t_8 + n_B \cdot d_{P1}$$

wherein $n_D$ is a refractive index of the dye layer 42, $n_B$ is a refractive index of the substrate 41, and $d_{P1}$ is a thickness of the substrate 41 on the bottom portion of the prepit.

The optical path $OL_{L1}$ on the portion 45 between the prepit 44 and its adjoining prepit is represented by the following formula:

$$OL_{L1} = n_D \cdot t_7 + n_B \cdot d_L$$

wherein $n_D$ and $n_B$ have the same meanings as defined above, and $d_L$ is a thickness of the substrate 41 at the portion 45 between the prepits.

$d_L$ is represented by the following formula:

$$d_L = d_{P1} + d_4$$

wherein $d_4$ is a depth of the prepit.

From the above formulae, a difference between $OL_{P1}$ and $OL_{L1}$ is represented by the following formula.

$$|OL_{P1} - OL_{L1}| = |n_D \cdot t_8 - (n_D \cdot t_7 + n_B \cdot d_4)|$$

In the information recording medium (B), the prepit 44 has a specific shape. That is, the half width (width of prepit at a depth of ½ of the depth of prepit) of the prepit 44 is in the range of 0.2 to 1.4 μm, preferably 0.3 to 1.0 μm, more preferably 0.35 to 0.7 μm. The depth $d_4$ of the prepit 44 is in the range of 150 to 400 nm, preferably 160 to 350 nm, more preferably 170 to 300 nm. The depth $d_4$ of the prepit 44 in the information recording medium is extremely larger than the depth (generally approx. 110 nm) of a prepit in the conventional CD.

$n_D$ is generally larger than $n_B$, and in the information recording medium (B), the depth $d_4$ of the prepit 44 is made extremely larger than a depth of a conventional prepit, so that $t_8$ is extremely larger than $t_7$, whereby $OL_{P1}$ becomes larger than $OL_{L1}$, and a difference between $OL_{P1}$ and $OL_{L1}$, namely $|OL_{P1} - OL_{L1}|$, becomes large.

The information recording medium (B) is so constructed that the total optical path $OL_{P1}$ of the optical path of the substrate and that of the dye layer on the bottom portion of the prepit is larger than the total optical path $OL_{L1}$ of the optical path of the substrate and that of the dye layer on the portion between the prepits by not less than $\lambda/8$ ($\lambda$ is a wavelength of a reproducing laser beam), preferably not less than $\lambda/4$.

In order to make difference between $OL_{P1}$ and $OL_{L1}$ not less than $\lambda/8$ in the information recording medium (B), the refractive index $n_D$ of the dye layer 42 and the refractive index $n_B$ of the substrate 41 are determined in consideration of the thickness $t_7$ and $t_8$ of the dye layer 42 in such a manner that when the dye layer 42 is formed on the substrate having been provided with the prepit 44 having the above-described depth $d_4$, the resulting medium satisfies the following formula.

$$|OL_{P1} - OL_{L1}| \geq \lambda/8$$

The values $n_D$ and $n_B$ must be determined in consideration of values $t_7$ and $t_8$ and a relationship between $n_D$ and $n_B$. Though they cannot be determined unequivocally, a dye having a desired value of $n_D$ and a substrate material having a desired value of $n_B$ can be easily selected by the skilled in the art in consideration of the above-mentioned conditions.

The dye having a desired value of $n_D$ and the substrate material having a desired value of $n_B$ determined as above are not special ones, and they can be selected from those conventionally known. Further, the above-mentioned values $t_7$ and $t_8$ are each thickness of a dye layer prepared by coating a dye solution through a conventional coating method. In spite of those conventional materials and known method, difference between $OL_{P1}$ and $OL_{L1}$ can be made not less than $\lambda/8$ in the information recording medium (B) because the prepit is so formed as to allow its dimension (particularly its depth) to have a value within a specific range.

In the information recording medium (B), difference between $OL_{P1}$ and $OL_{L1}$ is not less than $\lambda/8$, so that when the medium is irradiated with a laser beam to reproduce information, the phase difference between the portion 45 between prepits and the bottom portion 46 of the prepit becomes large, and thereby reproduced signal having high modulation degree of not less than 50% can be obtained.

If the substrate material is plastic, the substrate having the aforementioned prepits and pregroove can be prepared by means of injection molding using a stamper.

On the surface of the substrate, a pregroove layer for forming the prepits and a pregroove may be provided as mentioned above.

In the above information recording medium (B), the pregroove has generally such a shape that the half width of a pregroove (i.e., width of pregroove at the depth of ½ of the depth of pregroove) is in the range of 0.2 to 1.4 μm, preferably 0.3 to 1.0 μm, more preferably 0.35 to 0.7 μm, and the depth of pregroove is in the range of 70 to 200 nm, preferably 80 to 180 nm, more preferably 90 to 160 nm. The groove may be subjected to wobbling for the purpose of addressing or controlling a linear speed.

The depth of the pregroove is smaller than the depth of the prepit on the same substrate by not less than $\lambda/8$ ($\lambda$ has the same meaning as defined above) in terms of optical path.

The pregroove can be formed simultaneously with the formation of the prepit in the similar manner to that for the prepit.

There is no specific limitation on the dye employable for the information recording medium (B) and any dyes described for the information recording medium (A) can be employed.

Formation of the dye layer can be conducted by dissolving the dye (and a binder, if desired) in a solvent to prepare a coating solution, then coating the solution on the surface of the substrate and drying the coated layer of the solution.

Examples of the solvents employable in the coating solution for the formation of a dye layer include esters such as ethyl acetate, butyl acetate and cellossolve acetate; ketones such as methyl ethyl ketone, cyclohexanone and methyl isobutyl ketone; halogenated hydrocarbons such as dichloromethane, 1,2-dichloroethane and chloroform; ethers such as tetrahydrofuran, ethyl ether and dioxane; alcohols such as ethanol, n-propanol, isopropanol and n-butanol; amides such as dimethylformamide; and fluorine-containing solvents such as 2,2,3,3-tetrafuoropropanol. These non-hydrocarbon organic solvents may contain hydrocarbon solvents such as aliphatic hydrocarbon solvents, alicyclic hydrocarbon solvents and aromatic hydrocarbon solvents in an amount of not more than 50% by volume.

The coating solution may further contain various additives such as an antioxidant, a UV-absorbent, a plasticizer and a lubricant according to the purpose.

In the case of using a binder, examples of the binders include natural organic polymer materials such as gelatin, dextran, rosin and rubber; and synthetic organic polymer materials such as cellulose derivative (e.g., cellulose acetate and nitrocellulose), hydrocarbon resins (e.g., polyethylene, polypropylene, polystyrene, polyisobutylene and chlorinated polyethylene), vinyl resins (e.g., polyvinyl chloride, polyvinylidene chloride, polyvinyl chloride/polyvinyl acetate copolymer and polyvinyl alcohol), acrylic resins (e.g., polymethyl acrylate and polymethyl methacrylate), and precondensates of thermosetting resins (e.g., epoxy resin, butyral resin, rubber derivative and phenol/formaldehyde resin).

As the coating method, there can be mentioned spray coating, spin coating, dip coating, roll coating, blade coating, doctor roll coating, screen printing, etc. Of these, spin coating is preferably employed in order to form favorable orientation of the dye.

When a binder is used as a material of the dye layer, a ratio of the dye to the binder is generally in the range of 0.01 to 99% (by weight), preferably 1.0 to 95% (by weight).

The thickness of the dye layer on the portion between prepits is preferably in the range of 40 to 400 nm, more preferably 60 to 300 nm, most preferably 80 to 250 nm.

In the information recording medium (B), an enhancing layer may be provided between the dye layer and a reflecting layer which is optionally provided, to enhance the reflectance.

In the information recording medium (B), a reflecting layer is further provided on the dye layer, and a protective layer may be further provided on the dye layer or the reflecting layer. Materials and methods for forming the reflecting layer and the protective layer may be the same as those described for the information recording medium (A).

Recording of information on the information recording medium (B) and reproduction of information from the information recording medium (B) can be also carried out in the similar manner to those described for the information recording medium (A).

Subsequently, the information recording medium (C) of the embodiment according to the invention is described in detail.

The information recording medium (C) has a basic structure has a disc-shaped substrate provided with a prepit area containing prepits and a pregroove area containing pregroove, a dye layer containing a dye which is provided on the substrate and a reflecting layer made of a metal which is provided on the dye layer, superposed in this order. The medium also shows a high modulation degree of not less than 50% in a prepit area. In the medium (C), the relationship between a depth of each of the prepits and a thickness of the dye layer in the prepit area satisfies the following formula (I):

$$0.15\lambda \leq n_s d_p - n_d \Delta t_p \leq 0.24\lambda \qquad (I)$$

and the relationship between a depth of the pregroove and a thickness of the dye layer in the pregroove area satisfies the following formula (II):

$$0.02\lambda \leq n_s d_g - n_d \Delta t_g \leq 0.08\lambda \qquad (II)$$

in which $n_s$ represents a refractive index of the substrate, $n_d$ represents a refractive index of the dye layer, $d_p$ represents a depth of each of the prepits, $\Delta t_p$ represents a difference between a thickness of the dye layer on the bottom portion of each of the prepits and that of the dye layer on the portion between the prepits, $d_g$ represents a depth of the pregroove, $\Delta t_g$ represents a difference between a thickness of the dye layer on the bottom portion of the pregroove and that of the dye layer on the land portion, and $\lambda$ represents a wavelength of a reproducing laser beam.

Figure 5A:
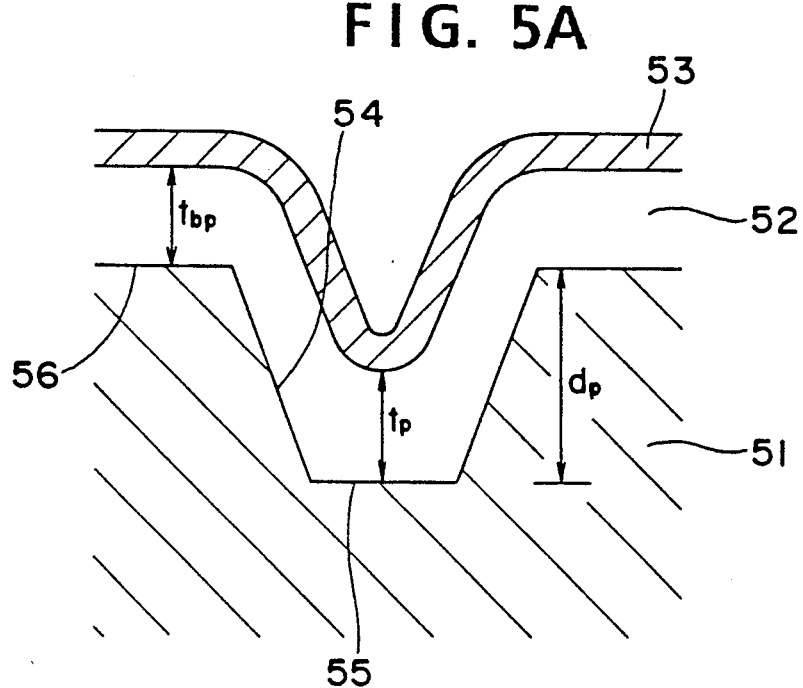
FIG. 5A is a sectional view schematically showing a part of a section of one example of the information recording medium (C) according to the invention at the prepit.

FIG. 5A is a sectional view schematically illustrating a part of a section of one example of the information recording medium (C) at a prepit. In FIG. 5A, on a substrate 51 made of plastic is formed a dye layer 52 made of a dye, and on the dye layer 52 is formed a reflecting layer 53 made of a metal. The substrate 51 is provided with a prepit 54.

$d_p$ is the depth of the prepit. Difference between the thickness $t_p$ of the dye layer 52 on the bottom portion 55 of each of the prepits and the thickness $t_{bp}$ of the dye layer on the portion 56 between the adjoining prepits corresponds to $\Delta t_p$ of the above formula (I). The thickness $t_p$ is generally larger than the thickness $t_{bp}$.

In the prepit area, intensity of signal generally becomes larger when the reflectance is zero. Such intensity can be obtained when the phase difference of the prepit is $\frac{1}{2}\lambda$. However, it is required that the phase difference produces push-pill signal for controlling tracking, and further the intensity of such push-pull signal is almost equal to that of the push-pull signal of a pregroove area in the same disc. In the case that the phase difference (corresponding to "$n_s d_p - n_d \Delta t_p$" in the formula (I)) is within a range defined by the formula (I), both a high modulation degree and an excellent tracking are obtained in the prepit area.

Figure 5B:
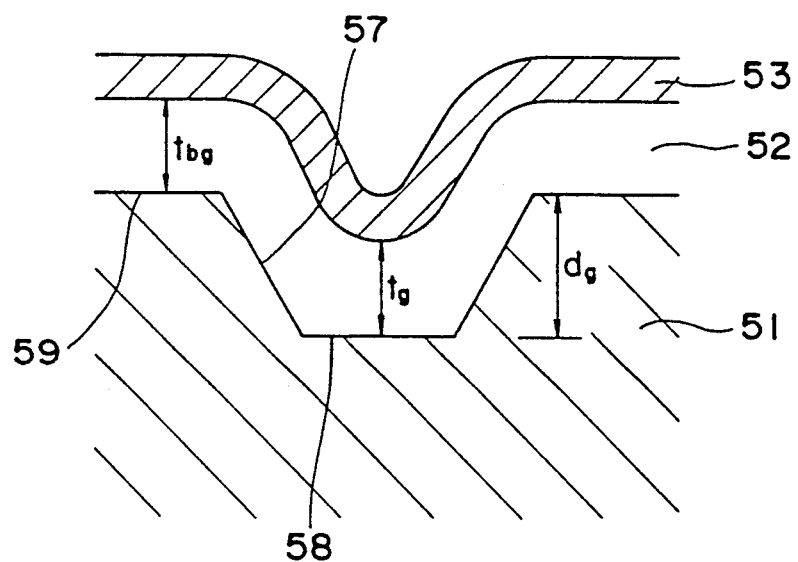
FIG. 5B are a sectional view schematically showing a part of a section of one example of the information recording medium (C) according to the invention at the pregroove.
Figure 6A:
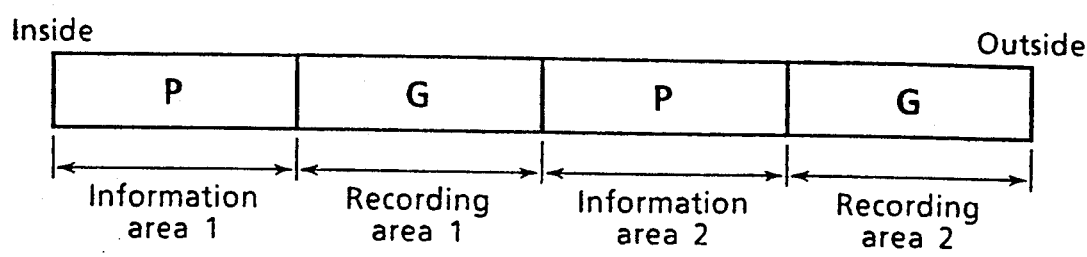
FIGS. 6A to 6E are schematic views showing a structure of the prepit portion and the pregroove portion and a format thereof comprising the information area and the recording area in the information recording medium (D) according to the invention.
Figure 6B:
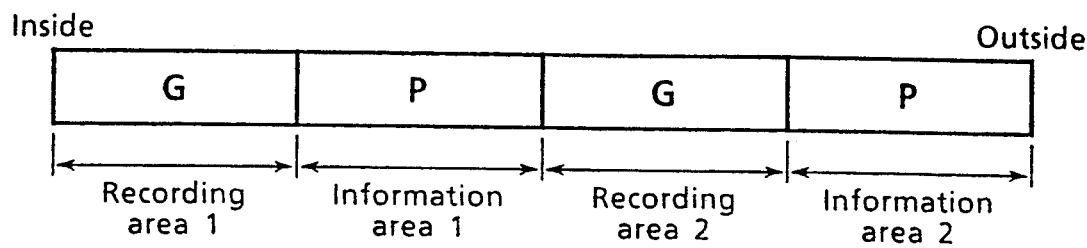
Figure 6C:
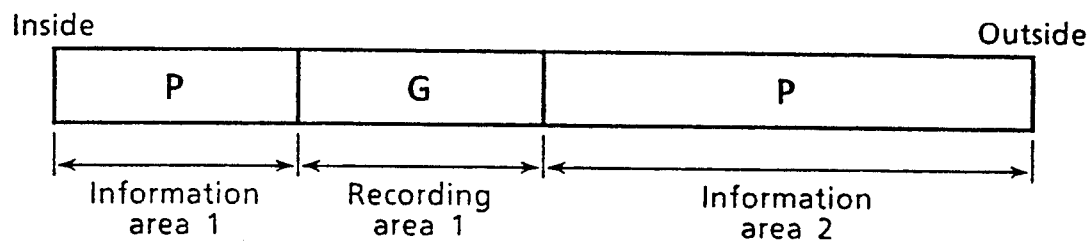
Figure 6D:
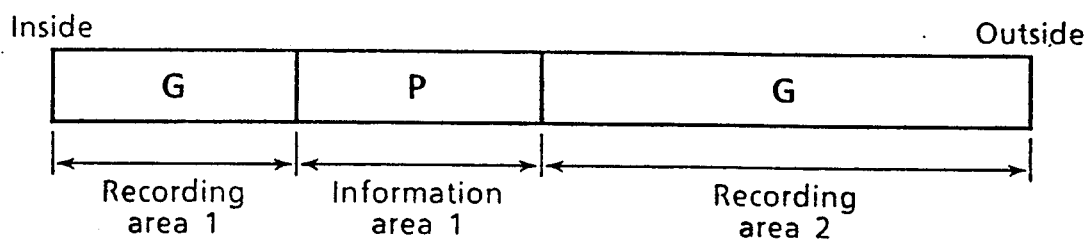
Figure 6E:
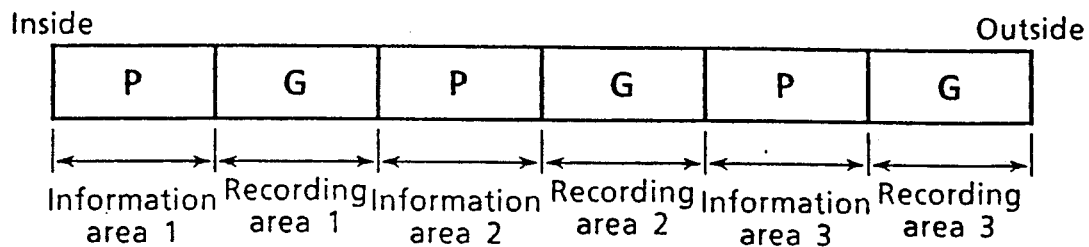

FIG. 5B is a sectional view schematically illustrating a part of a section of one example of the information recording medium (C) at the pregroove. In FIG. 5B, on a substrate 51 made of plastic is formed a dye layer 52 made of a dye, and on the dye layer 52 is formed a reflecting layer 53 made of a metal. The substrate 51 is provided with a pregroove 57.

$d_g$ is the depth of the pregroove. Difference between the thickness $d_g$ of the dye layer 52 on the bottom portion 58 of the pregroove and the thickness $t_{bg}$ of the dye layer 52 on the land portion 59 corresponds to $\Delta t_g$ of the above formula (II). The thickness $t_g$ is generally larger than the thickness $t_{bg}$.

The pregroove area is generally preferable to have a high reflectance before recorded with information. The high reflectance can be obtained when phase difference of the pregroove is zero. However, it is required that the phase difference generates push-pull signal for controlling tracking, and further that intensity of such push-pull signal is almost equal to that of the signal of a prepit area in the same disc. In the case that the phase difference (corresponding to "$n_s d_g - n_d \Delta t_g$" in the formula (II)) is within a range defined by the formula (II), both a high modulation degree and an excellent tracking are obtained in the pregroove area.

The formula (I) is represented by the following formula (III):

$$0.17\lambda \leq n_s d_p - n_d \Delta t_p \leq 0.22\lambda \qquad (III)$$

in which $n_s$, $d_p$, $n_d$, $\Delta t_{pn}$ and $\lambda$ are the same as defined above.

The formula (II) is represented by the following formula (IV):

$$0.03\lambda \leq n_s d_g - n_d \Delta t_g \leq 0.06\lambda \qquad (IV)$$

in which $n_s$, $d_q$, $n_d$, $\Delta t_g$ and $\lambda$ are the same as defined above.

The depth $d_p$ of the prepit is preferred in the range of 80 to 300 nm. The depth $d_g$ of the pregroove is preferred in the range of 10 to 230 nm. The difference $\Delta t_p$ of the thickness of the dye layer on the bottom portion of the prepit and that on the portion between prepits is preferred the range of 0 to 120 nm. Further, the difference $\Delta t_g$ of the thickness of the dye layer on the bottom portion of the pregroove and that on the land is preferred the range of 0 to 120 nm.

The materials of a substrate and other layers of the information recording medium (C) are employable the same those as the media (A) and (B), and their preparations can be conducted in the same manner as those of the media (A) and (B). Further, recording and reproducing of the medium (C) can be conducted in the same manner as those of the media (A) and (B).

The above information recording media (A) to (C) are prepared by coating a dye solution over an almost whole surface of a substrate provided with prepits and a pregroove, and the reproduced signal from the media shows high modulation degrees and high reflectances. By using basic structures such as a substrate provided with the prepit and pregroove having the specific shape and a dye layer having the specific thickness provided hereon as shown in media (A) to (C), there can be obtained the information recording medium (D) of the embodiment according to the invention which has a plurality of the prepit areas and pregroove areas in combination.

The information recording medium (D) has a structure comprising a disc-shaped substrate provided with a prepit area and a pregroove area and a dye layer which is provided on the substrate, the dye layer being a layer for recording information by forming reproducing pits thereon under irradiation with a laser beam, wherein the prepit area has a modulation degree of not less than 50%, and at least one of the prepit area and the pregroove area is present in two or more places.

In the information recording medium (D), a modulation degree of the prepit area is not less than 50%, in spite that the dye layer is provided on the substrate having been provided with the prepit area, so that it is possible to form the same dye layer on both the prepit area and the pregroove area of the substrate as mentioned previously. By preparing an information recording medium using a substrate provided with a prepit area and a pregroove area at least one of which is present in plural places, the prepit areas and the pregroove areas can be allowed to exist in one information recording medium in a mixed state.

In an conventional information recording medium having a prepit area and a pregroove area, it is impossible to provide a dye layer on the prepit area as described hereinbefore. Therefore, in order to allow a plurality of prepit area and pregroove area to exist in a mixed state, the dye layer must be formed on only the pregroove area without forming the dye layer on the prepit area. Though the dye layer is generally formed by coating a solution containing a dye over the substrate, formation of the dye layer on only the pregroove area of the substrate is practically difficult.

However, the information recording medium (D) of the invention can be prepared by forming a uniform dye layer over the whole surface of the substrate through coating of a dye-containing solution on the substrate having been provided with a prepit area and a pregroove area (at least one of those being present in plural places) using a known coating method. Thus, various formats can be formed in the recording medium (D), which is difficult in the conventional recording medium.

Structures of the prepit area and the pregroove area of the information recording medium (D) according to the invention and embodiments of their format are described referring to the attached drawings.

FIGS. 6A to 10D are schematic views illustrating examples of structures of the prepit area and the pregroove area and embodiments of format thereof in the information recording medium (D) according to the invention. FIG. 11 schematically illustrates structures of the prepit portion and the pregroove portion and format thereof in a conventional information recording medium.

In FIGS. 6A to 11G, P, G and g indicate a prepit area, a pregroove area and a gap, respectively. The information area means an area on which information has been previously recorded. The area is recorded with information (e.g., program data) by a manufacturer of the recording medium through master-molding, etc. The recording area means an area on which a manufacturer or a user of the information recording medium can be additionally record information after the preparation of the medium. On this area, a user can write new data according to the program given by the information area, or a manufacturer of the recording medium can record on each disc (medium) different information such as a user's number. One example of utilization, of the information area is described below. A plurality of programs are recorded on the information area, and permission signal for use of the programs is recorded on the recording area in such a manner that some programs can be used but other programs cannot be used (i.e., protected) for each particular disc. Thus, several kinds of application discs can be prepared by means of only one process of master-molding.

The control information area is an area which is sometimes referred to "Read-in", and on this area information for controlling the content of the information area (directory information, time information, number of information such as number of musics, etc.) has been recorded. Otherwise, this area is also an area indicating an information-introducing part in CD-DA (Compact Disc—Digital to Analog). The end area, which is sometimes referred to "Read-out", indicates the last part of the information area. The control area is an area on which various information (e.g., information on forbiddance of copy, information on permission number of copy, information on users to whom copy is permitted, information on user's machine to which copy is permitted and information on the number of copy) has been recorded, or an area on which those information can be recorded. The Q area is an area for adjusting a recording or reproducing power and/or an area for temporarily recording information.

The "Inside" of each figure indicates a central direction of the information recording medium, and the "Outside" indicates an outer periphery direction of the information recording medium.

Figure 11A:
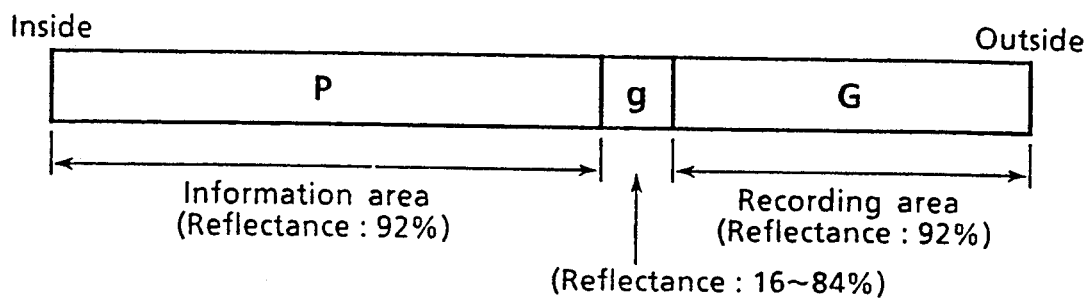
FIGS. 11A to 11G are schematic views showing a structure of the prepit portion and the pregroove portion and a format thereof applicable to the conventional information recording medium.

A conventional information recording medium shown in FIG. 11A is provided with one information area composed of a prepit area and one recording area composed of a pregroove area. Between the prepit area and the pregroove area, a gap of about several millimeter is formed. In the conventional information recording medium, a dye layer is formed on only the pregroove area but not formed on the prepit area as described previously, so that the gap is necessarily formed therebetween.

In the information recording medium (D) of the invention, the same dye layer is formed on both the prepit area and the pregroove area, so that any gap is not formed therebetween. Hence, each of the prepit area and the pregroove area can be optionally provided in number, size and place. FIGS. 6A to 6E show several embodiments of the structure of the prepit area and the pregroove area in the information recording medium according to the invention. For example, the information recording medium shown in FIG. 6A have two prepit areas and two pregroove areas each of which is provided alternately, and each of those areas forms an information area 1, a recording area 1, an information area 2 and a recording area 2, respectively. This construction results in that each area can be distributed to a different user, for example, the information area 1 and the recording area 1 are distributed to a user 1 and the information area 2 and the recording area 2 are done to a user 2, whereby a multi-user system can be obtained. Alternatively, each area can be distributed to a different program, for example, the information area 1 and the recording area 1 are distributed to a program 1 and the information area 2 and the recording area 2 are done to a program 2, whereby a multi-program system can be obtained. Accordingly, the information recording medium (D) of the invention shows such excellent effects that reduction of an access time of a pick-up, and ease of program-controlling and design of system-program are made.

The size of each prepit area and each pregroove area may be not less than 1 track, and the total size thereof can be enlarged up to the limitation of the capacity of the information recording medium. Hence, the number of the prepit areas and the pregroove areas can be optionally determined within the range of 3 to $10^7$ in a total number. The number depends on the use purpose of the information recording medium and the content of the program.

FIGS. 6A to 6E show embodiments in which any gap is not formed between the prepit area and the pregroove area, but if necessary, a gap of optional size may be formed therebetween.

In the conventional information recording medium shown in FIG. 11A, a gap of about several millimeter is formed between the prepit area and the pregroove area, as described previously. On the prepit area, no dye layer is formed, and a reflecting layer made of a metal is directly formed on the substrate, so that the prepit area generally has a reflectance of approx. 92%. On the other hand, the pregroove area generally has a reflectance of approx. 84% because a dye layer is provided thereon. On the gap area, an edge part of the dye layer is present, and therefore the reflectance of the gap area is greatly varied within the range of generally approx. 16 to 84%. Accordingly, when the pick-up passes through the gap area under focusing, the pick-up sometimes deviates from the focused condition. For coping with this problem, it is required to add a new controlling system to the hardware device. Moreover, the recording capacity of the information recording medium is made smaller because of presence of the gap.

Figure 7:
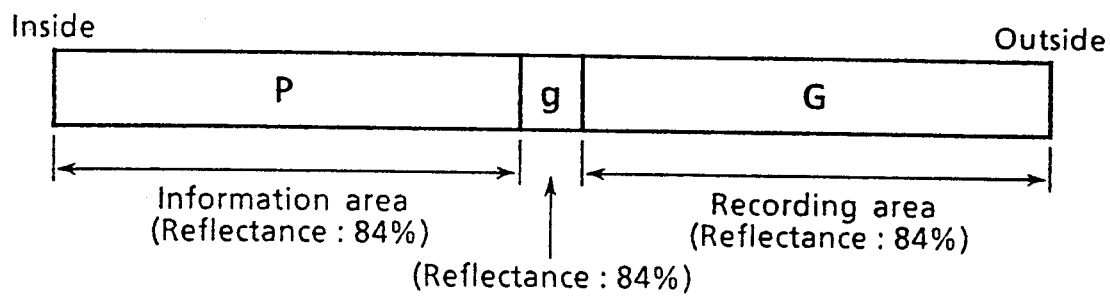
FIG. 7 is a schematic view showing a structure of the prepit portion, the gap portion and the pregroove portion and a format thereof comprising the information area and the recording area in the information recording medium (D) according to the invention.
Figure 8A:
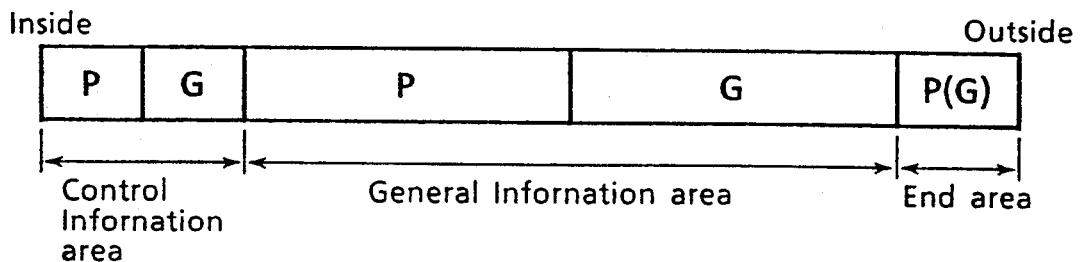
FIGS. 8A to 8G are schematic views showing a structure of the prepit portion and the pregroove portion and a format thereof comprising the control information area, the information area and the end area in the information recording medium (D) according to the invention.
Figure 8B:
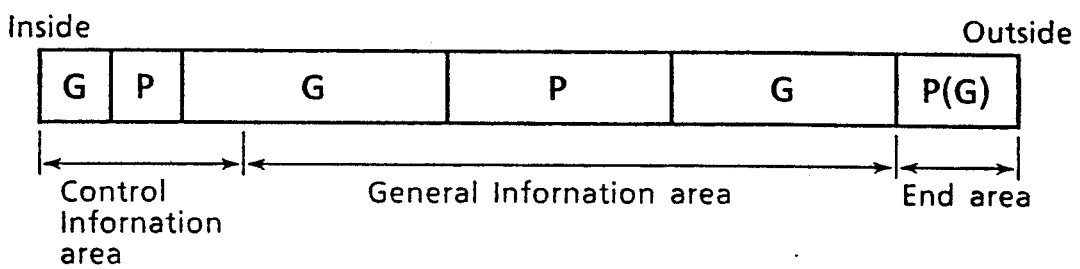
Figure 8C:
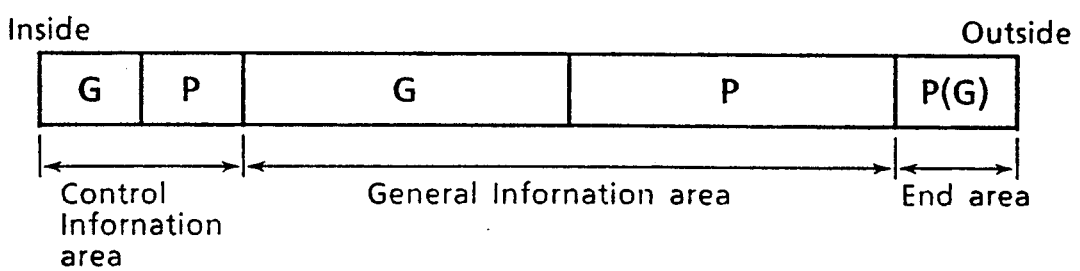
Figure 8D:
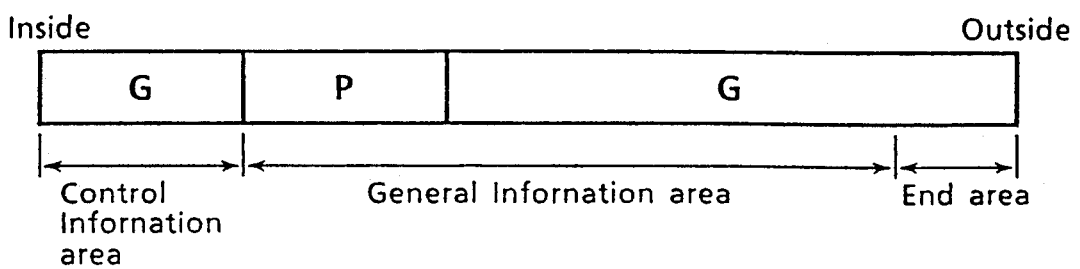
Figure 8E:
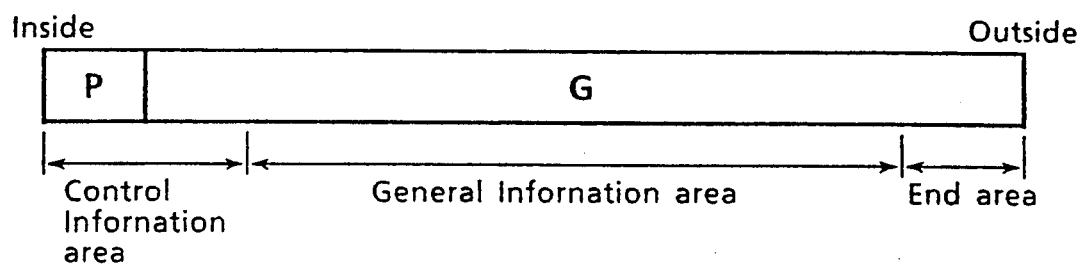
Figure 8F:
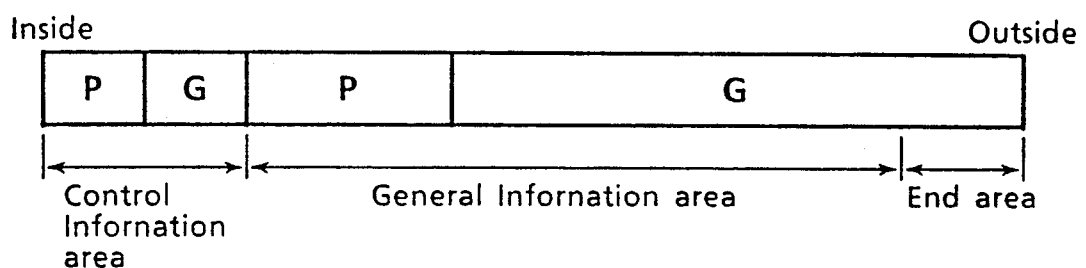
Figure 8G:
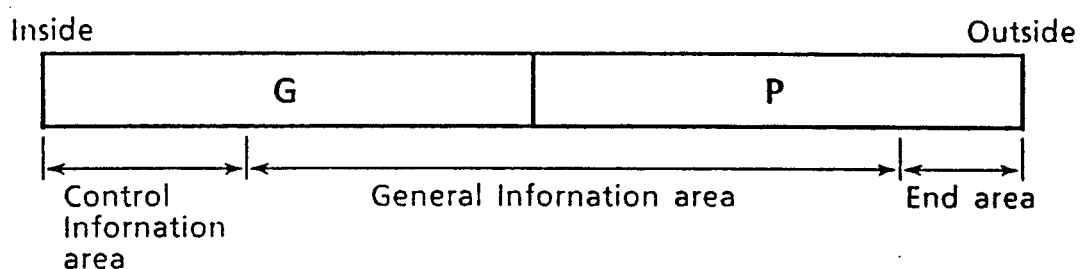

In the information recording medium (D) of the invention, however, even if a gap is intentionally provided depending on the purpose, reflectances of all areas of the medium are substantially the same because a uniform dye layer is formed on all the prepit area, the gap area and the pregroove area, as shown in FIG. 7. Accordingly, in the case of intentionally providing a gap, the pick-up can be kept in the focused condition even when the pick-up is moved under focusing. Naturally, it is possible to provide no gap in the information recording medium of the invention as described above. Accordingly, the information recording medium (D) of the invention can be provided with a gap of optional size, if desired, without any trouble.

Figure 11B:
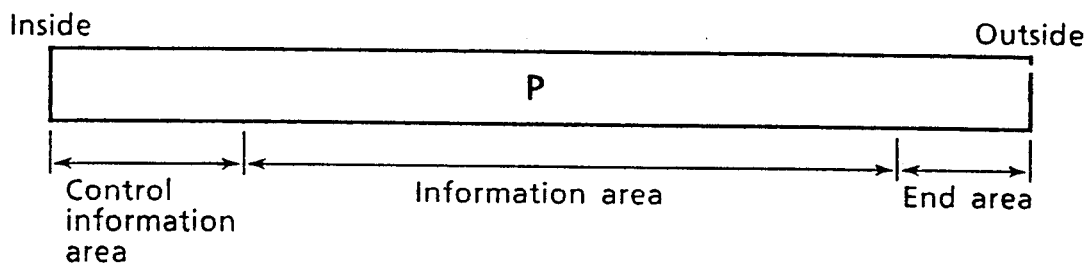
Figure 11C:
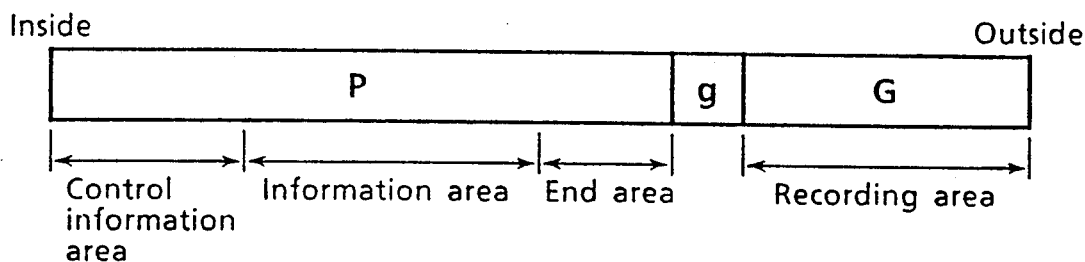

A conventional information recording medium shown in FIG. 11B is provided with a prepit area all over the substrate surface. On the prepit area, a control information area, an information area and an end area are provided. If a recording area is further provided to this recording medium of FIG. 11B, the resulting recording medium is obliged to take a construction of an information recording medium shown in FIG. 11C. In the construction of the information recording medium of FIG. 11C, however, the recording area exists on the outer side of the end area, so that conventional CD players can reproduce information of only the prepit area.

In the information recording medium (D) of the invention, the prepit area and the pregroove area can be formed in the optional number at the optional place, as shown in FIGS. 8A to 8G. Therefore, the control information area and the general information area can be optionally provided, and further the end area (may be either the prepit area or the pregroove area) can be provided on the outer periphery side. Accordingly, the information recorded on the recording medium of the invention can be reproduced using conventional CD players. In the information recording medium (D), each of the control information area and the general information area can include the prepit area and pregroove area in the optional number.

Figure 11D:
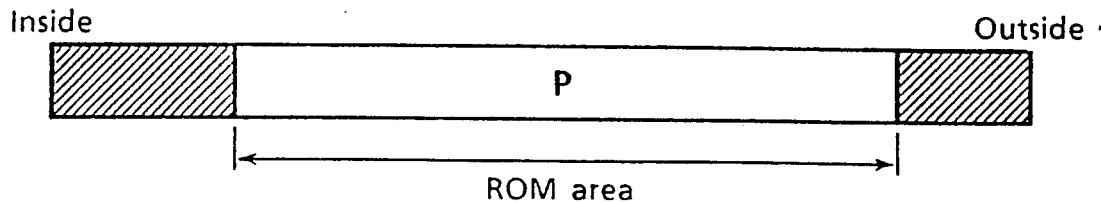

A conventional CD is constructed as shown in an information recording medium of FIG. 11D. When information is copied from the CD by means of a digital-digital method, the information can be copied without deterioration of the information. Therefore, information can be repeatedly copied from the original CD, in spite that a copy machine (e.g., DAT) is so treated to prohibit repetition of copy for the purpose of protection of copyright. Accordingly, protection of copyright is insufficient.

Figure 9A:
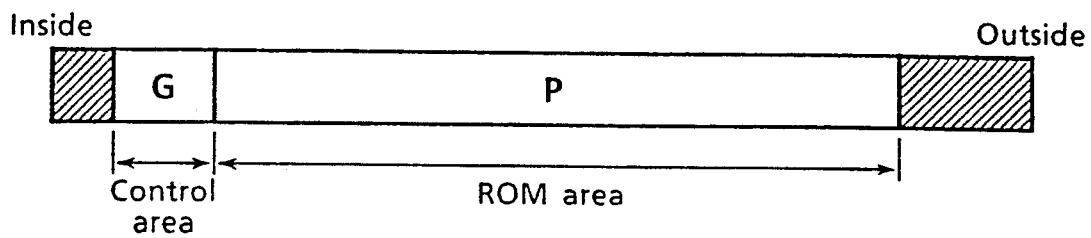
FIGS. 9A to 9C are schematic views showing a structure of the prepit portion and the pregroove portion and a format thereof comprising the control information area and the ROM area in the information recording medium (D) according to the invention.
Figure 9B:
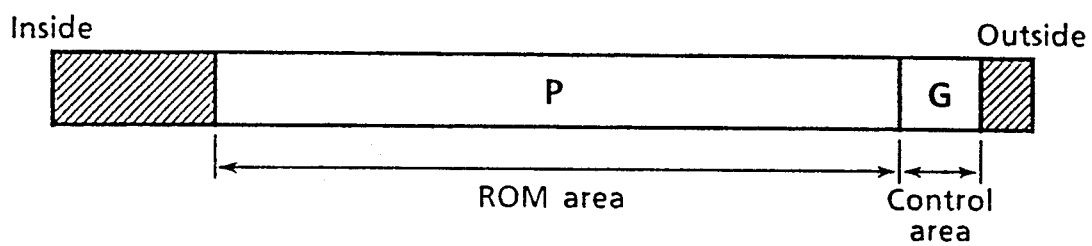
Figure 9C:
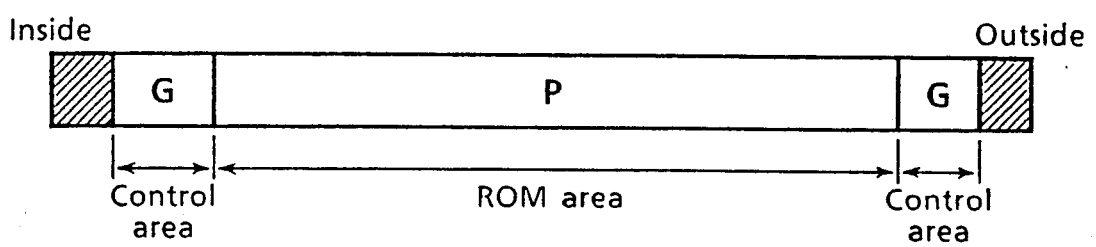
Figure 10A:
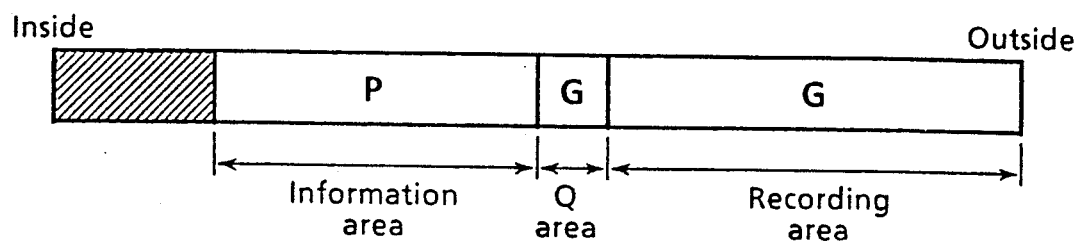
FIGS. 10A to 10D are schematic views showing a structure of the prepit portion and the pregroove portion and a format thereof comprising the information area, the Q area and the recording area in the information recording medium (D) according to the invention.
Figure 10B:
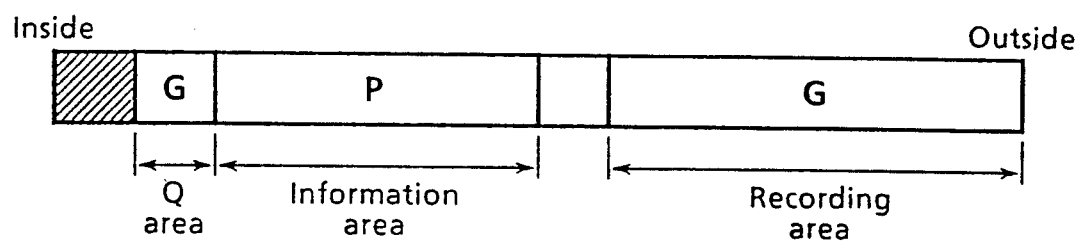
Figure 10C:
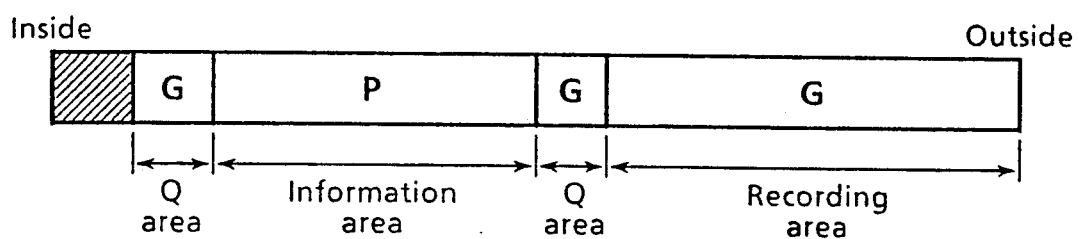
Figure 10D:
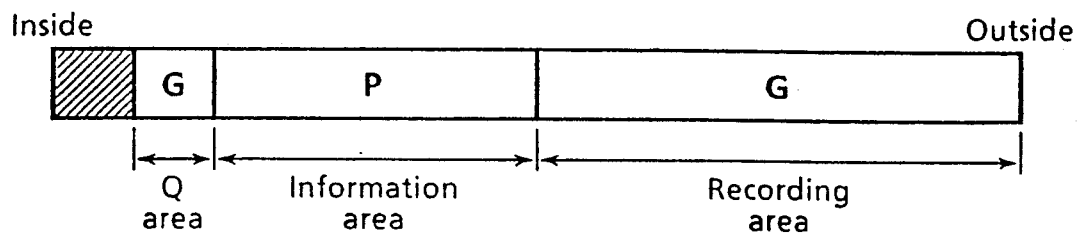

In the information recording medium (D) of the invention, a pregroove can be formed on an area which is not generally used for reproduction and is present on the inner periphery side and/or the outer periphery side of the ROM area (prepit area) wherein information composed of the prepits has been already recorded, and a control area can be formed on the pregroove, as shown in FIGS. 9A to 9C. On this control area, there can be previously recorded information relating to the aforementioned copy using the signal which is not ordinarily employed (for example, RSTUVW code of CD and wobble signal).

Figure 11E:
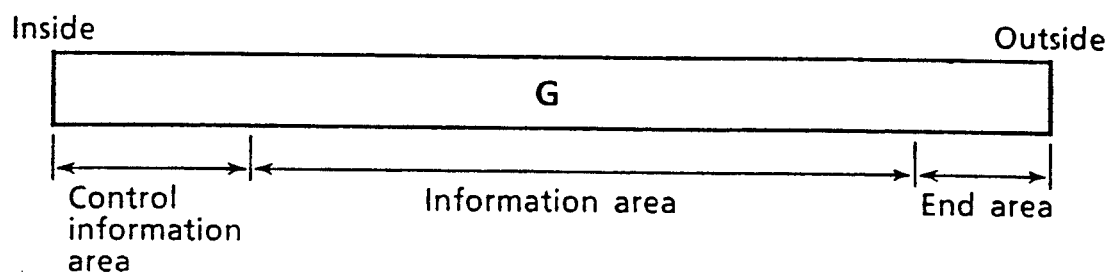
Figure 11F:
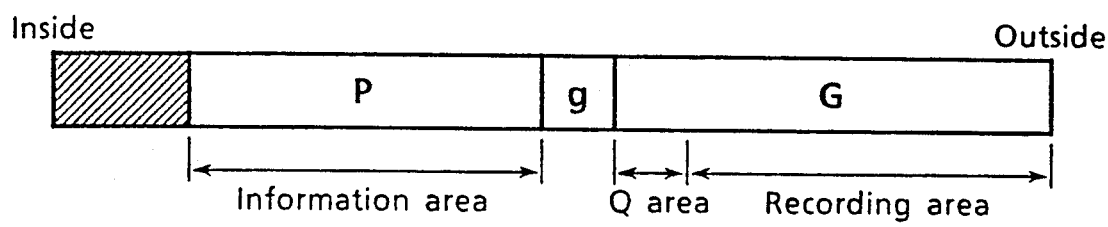
Figure 11G:
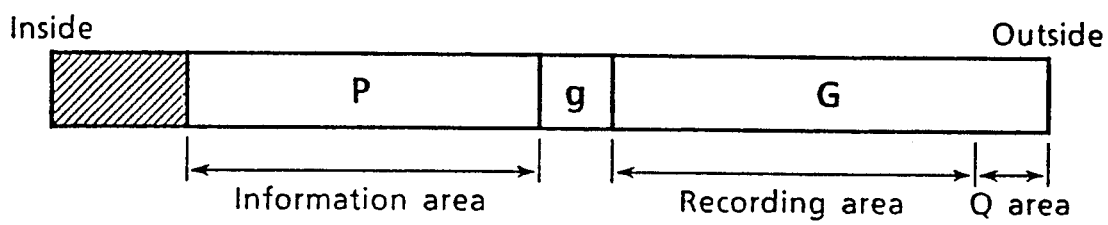

A conventional information recording medium shown in FIG. 11E is provided with a pregroove area all over the substrate surface. On the pregroove area, a control information area, an information area and an end area are provided. In the case of previously recording a part of information on this recording medium, the recording procedure must be made for all media using a recording machine, so that a long period of time is required for mass duplication.

Information recording media may be provided with the aforementioned Q area. When the Q area is provided in the conventional information recording medium, the resulting information recording medium can take only such a construction as shown in an information recording medium of FIGS. 11F or 11G. In the construction of the information recording medium 11F, a width of the gap is enlarged, and further the pick-up is obliged to pass on access the recording area which has been formed by an inadequate recording method in the power-adjusting stage. As a result, the pass of the pick-up brings about unfavorable influence on the hardware system and the construction does about reduction of the recording region. In the construction of the information recording medium of FIG. 11G, the outer periphery area of the recording medium tends to be easily stained in the handling procedure, and the substrate on the most outer periphery area thereof has a high birefringence so that the formed dye layer tends to be made ununiformly, resulting in severe problems for the power adjustment.

The information recording medium (D) of the invention can take such constructions as shown in FIGS. 10A to 10D, so that the above-mentioned problems never occur even if information relating to power adjustment or other inforation is recorded thereon.

As described in detail hereinbefore, development of various constructions can be thought as to CD-compatible information recording media, but it is practically impossible to apply such various constructions to the conventional information recording medium. If possible, the obtained information recording medium becomes extremely complicated or unstable. However, the information recording medium of the invention can easily take such various constructions. The embodiments shown in FIGS. 6A to 10D are only examples of the information recording medium of the invention, and naturally, the information recording medium of the invention can also take other constructions.

Examples of the present invention and comparison examples are given below, but those examples by no means restrict the invention.

At first, examples 1-12 according to the present invention, particularly to the information recording medium (A) of embodiment thereof and comparison examples 1-3 are given below.

EXAMPLE 1

A disc-shaped polycarbonate substrate (outer diameter: 120 mm, inner diameter: 15 mm, thickness: 1.2 mm) provided with prepits (half width of prepit: 0.6 μm, depth of prepit: 130 nm) having been recorded with EFM signal within the region of from 46 mm to 80 mm in diameter and a pregroove (track pitch: 1.6 μm, half width of pregroove: 0.55 μm, depth of pregroove: 50 nm) within the region of from 80 nm to 118 mm in diameter was prepared.

Separately, a dye (I) (refractive index: 2.8) having the following formula was dissolved in propylene glycol monoethyl ether to prepare a dye solution containing 2.4 wt. % of the dye (I).

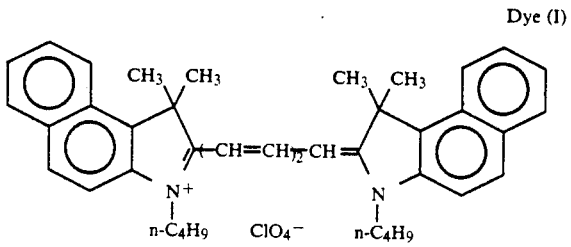

Dye (I)

Thus obtained dye solution had a concentration limit (critical concentration) of 70% at 23° C.

The dye solution was kept at 23° C., and the dye solution was coated over the above-mentioned substrate having a temperature of 23° C. by means of spin coating under the rotation of the substrate at 200 r.p.m. for 4 seconds. Then, the coated layer of the solution on the substrate was dried under the rotation of the substrate at 700 r.p.m. for 30 seconds, to form a dye layer on the substrate.

On the dye layer was formed a reflecting layer made of Au having a thickness of 100 nm by means of DC sputtering of Au under the conditions of an electric power of 480 W, a target-substrate distance of 95 mm, a gas pressure of 2 Pa and a rate of 2 nm/sec.

Then, on the reflecting layer was coated a UV-curable resin (trade name: 3070, available from Three Bond Co., Ltd.) by means of spin coating at 1,500 r.p.m., and the layer of the resin was irradiated with ultraviolet rays using a high-voltage mercury lamp to cure the layer, so as to form a protective layer having a thickness of 2 μm on the reflecting layer.

Thus, an information recording medium consisting of a substrate, a dye recording layer, a reflecting layer and a protective layer was prepared.

The obtained information recording medium was measured on the optical thickness of the dye layer on the bottom portion of the pregroove, the optical thickness of the dye layer on the land portion, the reflectance of the mirror portion, the reflectance of the pregroove, the reflectance of the pregroove after recording of signal and the tracking servo gain by the later-mentioned evaluation methods. The results are set forth in Tables 1A and 1B.

EXAMPLE 2

Using the same substrate as used in Example 1, a dye layer was formed on the substrate in the same manner as described in Example 1 except for using a dye solution having been prepared by dissolving a dye (II) (refractive index: 2.9) having the following formula in a mixture solvent of 2,2,3,3-tetrafluoropropanol and propylene glycol monoethyl ether (ratio by volume: 92:8), the dye solution containing the dye (II) in an amount of 2.3 wt. % (the concentration limit of the dye solution at 23° C. was 90%).

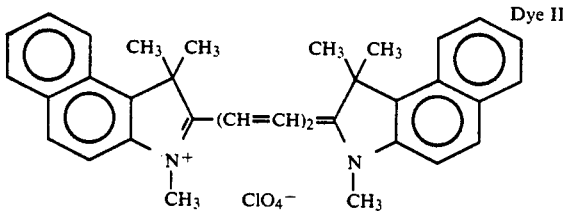

Then, on the dye layer formed on the substrate, a reflecting layer and a protective layer were superposed in order in the same manner as described in Example 1, to prepare an information recording medium.

The obtained information recording medium was evaluated in the same manner as described in Example 1. The results are set forth in Tables 1A and 1B.

EXAMPLE 3

Using the same substrate as used in Example 1, a dye layer was formed on the substrate in the same manner as described in Example 1 except for using a dye solution having been prepared by dissolving the dye (II) in a mixture solvent of 2,2,3,3-tetrafluoropropanol and butanol (ratio by volume: 70:30), the dye solution containing the dye (II) in an amount of 2.3 wt. % (the critical concentration of the dye solution at 23° C. was 90%). Then, on the dye layer formed on the substrate, a reflecting layer and a protective layer were superposed in order in the same manner as described in Example 1, to prepare an information recording medium.

The obtained information recording medium was evaluated in the same manner as described in Example 1. The results are set forth in Tables 1A and 1B.

EXAMPLE 5

Using the same substrate as used in Example 1 except that the half width of the prepit was 0.5 μm and the depth of the prepit was 90 nm, a dye layer, a reflecting layer and a protective layer were superposed in order on the substrate in the same manner as described in Example 1. Thus, an information recording medium was prepared.

The obtained information recording medium was evaluated in the same manner as described in Example 1. The results are set forth in Tables 1A and 1B.

EXAMPLE 6

Using the same substrate as used in Example 1, a dye layer was formed on the substrate in the same manner as described in Example 1 except for using a dye solution having been prepared by dissolving the dye (II) in a mixture solvent of 2,2,3,3-tetrafluoropropanol and isopropyl ether (ratio by volume: 90:10), the dye solution containing the dye (II) in an amount of 2.3 wt. % (the concentration limit of the dye solution at 23° C. was 80%). Then, on the dye layer formed on the substrate, a reflecting layer and a protective layer were superposed in order in the same manner as described in Example 1, to prepare an information recording medium.

The obtained information recording medium was evaluated in the same manner as described in Example 1. The results are set forth in Tables 1A and 1B.

EXAMPLE 7

Using the same substrate as used in Example 1, a dye layer was formed on the substrate in the same manner as described in Example 1 except for using a dye solution having been prepared by dissolving the dye (II) in a mixture solvent of 2,2,3,3-tetrafluoropropanol and diisopropyl ketone (ratio by volume: 70:30), the dye solution containing the dye (II) in an amount of 2.3 wt. % (the concentration limit of the dye solution at 23° C. was 65%). Then, on the dye layer formed on the substrate, a reflecting layer and a protective layer were superposed in order in the same manner as described in Example 1, to prepare an information recording medium.

The obtained information recording medium was evaluated in the same manner as described in Example 1. The results are also set forth in Tables 1A and 1B.

EXAMPLE 8

Using the same substrate as used in Example 1, a dye layer was formed on the substrate in the same manner as described in Example 1 except for using a dye solution having been prepared by dissolving the dye (II) in a mixture solvent of 2,2,3,3-tetrafluoropropanol and acetic acid (ratio by volume: 90:10), the dye solution containing the dye (II) in an amount of 2.3 wt. % (the concentration limit of the dye solution at 23° C. was 60%). Then, on the dye layer formed on the substrate, a reflecting layer and a protective layer were superposed in order in the same manner as described in Example 1, to prepare an information recording medium.

The obtained information recording medium was evaluated in the same manner as described in Example 1. The results are set forth in Tables 1A and 1B.

EXAMPLE 9

Using the same substrate as used in Example 1, a dye layer was formed on the substrate in the same manner as described in Example 1 except for using a dye solution having been prepared by dissolving the dye (II) in a mixture solvent of 2,2,3,3-tetrafluoropropanol and ethyl cellosolve (ratio by volume: 90:10), the dye solution containing the dye (II) in an amount of 2.3 wt. % (the concentration limit of the dye solution at 23° C. was 70%). Then, on the dye layer formed on the substrate, a reflecting layer and a protective layer were superposed in order in the same manner as described in Example 1, to prepare an information recording medium.

The obtained information recording medium was evaluated in the same manner as described in Example 1. The results are set forth in Tables 1A and 1B.

EXAMPLE 10

Using the same substrate as used in Example 1, a dye layer was formed on the substrate in the same manner as described in Example 1 except for using a dye solution having been prepared by dissolving the dye (II) in a mixture solvent of 2,2,3,3-tetrafluoropropanol and butyl cellosolve (ratio by volume: 90:10), the dye solution containing the dye (II) in an amount of 2.3 wt. % (the concentration limit of the dye solution at 23° C. was 70%). Then, on the dye layer formed on the substrate, a reflecting layer and a protective layer were superposed in order in the same manner as described in Example 1, to prepare an information recording medium.

The obtained information recording medium was evaluated in the same manner as described in Example 1. The results are set forth in Tables 1A and 1B.

Using the same substrate as used in Example 1, a dye layer was formed on the substrate in the same manner as described in Example 1 except for using a dye solution having been prepared by dissolving the dye (II) in a mixture solvent of 2,2,3,3-tetrafluoropropanol and iso-amyl alcohol (ratio by volume: 70:30), the dye solution containing the dye (II) in an amount of 2.3 wt. % (the concentration limit of the dye solution at 23° C. was 55%). Then, on the dye layer formed on the substrate, a reflecting layer and a protective layer were superposed in order in the same manner as described in Example 1, to prepare an information recording medium.

The obtained information recording medium was evaluated in the same manner as described in Example 1. The results are set forth in Tables 1A and 1B.

EXAMPLE 12

The procedures of Example 2 were repeated except for replacing the dye (II) with a dye (III) (refractive index: 2.7) having the following formula, to prepare an information recording medium. The dye solution used in this process had a concentration limit of 90% at 23° C.

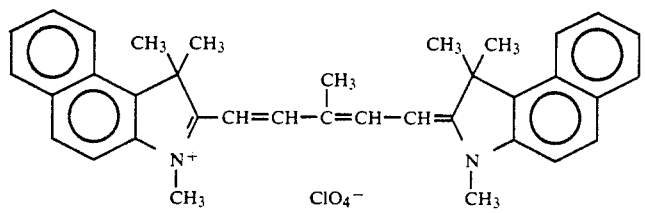

Dye (III)

The obtained information recording medium was evaluated in the same manner as described in Example 1. The results are set forth in Tables 1A and 1B.

COMPARISON EXAMPLE 1

Using the same substrate as used in Example 1, a dye layer was formed in the same manner as described in Example 1 except that the dye solution was replaced with the same dye solution as used in Comparison Example 1 except for using a dye solution having been prepared by dissolving the dye (I) in a solvent of 2,2,3,3-tetrafluoropropanol, the dye solution containing the dye (I) in an amount of 2.3 wt. % (the concentration limit of the dye solution at 23° C. was less than 20%). Then, on the dye layer formed on the substrate, a reflecting layer and a protective layer were superposed in order in the same manner as described in Example 1. Thus, an information recording medium was prepared.

The obtained information recording medium was evaluated in the same manner as described in Example 1. The results are set forth in Tables 1A and 1B.

COMPARISON EXAMPLE 2

Using the same substrate as used in Example 1, a dye layer was formed on the substrate in the same manner as described in Example 1 except for using a dye solution having been prepared by dissolving the dye (II) in 2,2,3,3-tetrafluoropropanol, the dye solution containing the dye (II) in an amount of 2.3 wt. % (the concentration limit of the dye solution at 23° C. was less than 20%). Then, on the dye layer formed on the substrate, a reflecting layer and a protective layer were superposed in order in the same manner as described in Example 1, to prepare an information recording medium.

The obtained information recording medium was evaluated in the same manner as described in Example 1. The results are set forth in Tables 1A and 1B.

COMPARISON EXAMPLE 3

Using the same substrate as used in Example 1, a dye layer was formed on the substrate in the same manner as described in Example 1 except for using a dye solution having been prepared by dissolving the dye (II) in a mixture solvent of 2,2,3,3-tetrafluoropropanol and ethanol (ratio by volume: 70:30), the dye solution containing the dye (II) in an amount of 2.3 wt. % (the concentration limit of the dye solution at 23° C. was less than 20%). Then, on the dye layer formed on the substrate, a reflecting layer and a protective layer were superposed in order in the same manner as described in Example 1, to prepare an information recording medium.

The obtained information recording medium was evaluated in the same manner as described in Example 1. The results are set forth in Tables 1A and 1B.

EVALUATION OF INFORMATION RECORDING MEDIUM

Signal was recorded on the bottom portion of the pregroove in each of the above-obtained information recording media using a disc-evaluation device (NA: 0.5, laser wavelength: 780 nm) and EFM encoder (KEN-WOOD) under the conditions of a laser power for recording signal (recording power) of 6 mW and a fixed linear speed of 1.3 m/sec.

1) Optical thickness of the dye layer on the bottom portion of the pregroove

An absolute thickness of the dye layer was measured through observation of a section of the recording medium using an electron microscope of ultra-high resolution (S900, produced by Hitachi, Ltd.). A separately prepared dye thin film was measured on the reflectance, transmittance and absolute thickness, and from these results, a refractive index of the dye layer was determined. From the above-obtained absolute thickness and the refractive index, an optical thickness of the dye layer was calculated.

2) Optical thickness of the dye layer on the land portion

The optical thickness of the dye layer on the land portion was determined in the similar manner to that of the above evaluation method 1).

3) Reflectance of the mirror portion

The reflectance of the mirror portion was measured using a reflectance of an Al plate whose reflectance was conventionally known as a reference by the use of a spectrophotometer (UV130, produced by Shimazu Seisakusho, Co., Ltd.).

4) Reflectance of the pregroove

The reflectance of the pregroove was measured using the above-obtained reflectance of the mirror portion as a reference by the use of the above disc evaluation device.

5) Reflectance of the pregroove after recording of signal

The reflectance of the groove after recording of signal was determined in the similar manner to that of the above evaluation method 4).

6) Tracking servo gain

The information recording medium was given oscillation from outside using an oscillator, to measure tracking servo gain of the medium by the use of a servo-analyzer. The values set forth in Tables 1A and 1B are values obtained by comparing with tracking servo gain of CD.

7) Optical thickness of the dye layer on the prepit portion

The optical thickness of the dye layer on the prepit portion was determined in the similar manner to that of the above evaluation method 1).

8) Optical thickness of the dye layer on the area between prepits

The optical thickness of the dye layer on the area between prepits was determined in the similar manner to that of the above evaluation method 1).

9) Modulation degree of signal of 11T

A direct current reproduced signal (signal intensity) having a recording length of 11T out of the recorded CD format signal was measured in the signal portion and the mirror portion (i.e., non-signal portion), and the modulation degree (C) of the reproduced signal was determined from the maximum intensity and the minimum intensity of the reproducing signal by the following formula:

$$C = \frac{SH - SL}{SH} \times 100$$

wherein SH is a maximum intensity of the signal, and SL is a minimum intensity of the signal.

TABLE 1A

| | Thickness of Dye layer (nm) | | | |
| --- | --- | --- | --- | --- |
| | Bottom portion of Pregroove | Land portion | Bottom portion of Prepit | Portion between Prepits |
| Ex. 1 | 362 | 327 | 358 | 321 |
| Ex. 2 | 348 | 320 | 351 | 327 |
| Ex. 3 | 343 | 318 | 347 | 313 |
| Ex. 4 | 361 | 326 | 365 | 321 |
| Ex. 5 | 358 | 324 | 359 | 320 |
| Ex. 6 | 341 | 313 | 347 | 310 |
| Ex. 7 | 351 | 315 | 355 | 308 |
| Ex. 8 | 343 | 318 | 349 | 304 |
| Ex. 9 | 349 | 317 | 347 | 311 |
| Ex. 10 | 341 | 309 | 348 | 301 |
| Ex. 11 | 352 | 312 | 350 | 306 |
| Ex. 12 | 338 | 303 | 343 | 304 |
| Com. Ex. 1 | 348 | 212 | 352 | 208 |
| Com. Ex. 2 | 340 | 208 | 358 | 214 |
| Com. Ex. 3 | 345 | 207 | 351 | 206 |

TABLE 1B

| | Reflectance (%) | | | TSG of Recording Area (%) | Modulation Degree (11T) of Prepit Portion |
| --- | --- | --- | --- | --- | --- |
| | Mirror portion | Pregroove portion (ratio) | After recording | | |
| Ex. 1 | 83.9 | 74.2 (88) | 41.8 | −1.1 | 68 |
| Ex. 2 | 81.7 | 71.7 (88) | 41.2 | −0.8 | 67 |
| Ex. 3 | 82.2 | 72.1 (88) | 40.9 | −0.9 | 68 |
| Ex. 4 | 84.3 | 74.2 (88) | 42.3 | −1.1 | 66 |
| Ex. 5 | 83.7 | 73.8 (88) | 42.1 | −1.1 | 61 |
| Ex. 6 | 81.9 | 71.2 (87) | 41.2 | −0.8 | 61 |
| Ex. 7 | 82.1 | 71.8 (87) | 40.7 | −0.8 | 68 |
| Ex. 8 | 82.3 | 72.3 (88) | 40.9 | −0.9 | 64 |
| Ex. 9 | 82.4 | 71.9 (87) | 40.8 | −0.7 | 69 |
| Ex. 10 | 82.1 | 71.7 (87) | 40.8 | −0.7 | 68 |
| Ex. 11 | 81.7 | 72.1 (88) | 41.1 | −0.8 | 67 |
| Ex. 12 | 89.2 | 79.8 (89) | 49.7 | −0.9 | 69 |
| Com. Ex. 1 | 84.2 | 79.2 (94) | 44.1 | −2.7 | 12 |
| Com. Ex. 2 | 81.8 | 77.7 (95) | 43.7 | −2.4 | 11 |
| Com. Ex. 3 | 82.3 | 78.1 (95) | 44.4 | −2.6 | 16 |

Note:
ratio = reflectance of pregroove portion/reflectance of mirror portion (%)
TSG = tracking servo gain As is evident from the results set forth in Tables 1A and 1B, the information recording medium (A) according to the invention had such excellent properties that both the reflectance of the pregroove and the reflectance thereof after recording of information were high in the pregroove area (information recording area), decrease of the tracking servo gain was small, and the modulation degree in the prepit area (ROM area) was large.

On the other hand, in the information recording media of comparison examples, the reflectance of the pregroove and the reflectance thereof after recording of information were low, decrease of the tracking servo gain was large, and the modulation degree in the prepit area (ROM area) was extremely small.

Subsequently, example 13 according to the present invention, particularly to the information recording medium (B) of embodiment thereof and comparison example 4 are given below.

A disc-shaped polycarbonate substrate (outer diameter: 120 mm, inner diameter: 15 mm, thickness: 1.2 mm, track pitch: 1.6 μm, refractive index $n_B$: 1.58) provided with prepits (half width of each prepits: 0.70 μm, depth of each prepits: 240 nm) having been recorded with EFM signal which has been formed within a region of from 46 mm to 80 mm in diameter and a pregroove (track pitch: 1.6 μm, half width of pregroove: 0.60 μm, depth of pregroove: 90 nm) which has been formed within a region of from 80 mm to 118 mm in diameter was prepared.

Separately, a dye (I) having the following formula was dissolved in 2,2,3,3-tetrafluoropropanol to prepare a dye solution containing 2.8 wt. of the dye (I).

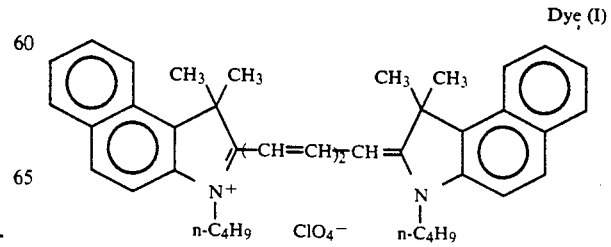

Dye (I)

The dye solution was coated over the above-mentioned substrate at 23° C. by means of spin coating under the rotation of the substrate at 200 r.p.m. for 5 seconds. Then, the coated layer of the solution on the substrate was dried under the rotation of the substrate at 700 r.p.m. for 30 seconds, to form a dye layer on the substrate.

On the dye layer was then formed a reflecting layer made of Au having a thickness of 100 nm by means of DC sputtering of Au under the conditions of an electric power of 480 W, a target-substrate distance of 95 mm, a gas pressure of 2 Pa and a rate of 2 nm/sec.

Then, on the reflecting layer was coated a UV-curable resin (trade name: 3070, available from Three Bond Co., Ltd.) by means of spin coating at 1,500 r.p.m., and the coated layer was then irradiated with ultraviolet rays using a high-voltage mercury lamp to cure the coated layer, so as to form a protective layer having a thickness of 2 μm on the reflecting layer.

Thus, an information recording medium consisting of a substrate, a dye recording layer, a reflecting layer and a protective layer was prepared.

The obtained information recording medium was measured on the thickness $t_8$ of the dye layer on the bottom portion of the prepit, the thickness $t_7$ of the dye layer on the portion between prepits, the total optical path $OL_{P1}$ of optical path of the substrate and optical path of the dye layer on the bottom portion of the prepit, the total optical path $OL_{L1}$ of optical path of the substrate and optical path of the dye layer on the portion between prepits, and the modulation degree of the prepit signal of 11T, by the later-mentioned evaluation methods. Further, EFM signal was recorded on the pregroove area, and the modulation degree of a signal of 11T reproduced from the recorded area was measured by the later-mentioned evaluation method. The results are set forth in Table 2.

COMPARISON EXAMPLE 4

Using the same disc-shaped polycarbonate substrate as that of Example 13 except that the half width of each of prepits having been recorded with EFM signal was 0.65 μm and the depth of the prepit thereof was 130 nm, instead of the substrate of Example 13, a dye layer, a reflecting layer and a protective layer were superposed in order on the substrate in the same manner as described in Example 13. Thus, an information recording medium was prepared.

The obtained information recording medium was evaluated in the same manner as described in Example 13. The results are also set forth in Table 2.

EVALUATION OF INFORMATION RECORDING MEDIUM

Each of the obtained information recording media was measured on the thickness $t_8$ of the dye layer on the bottom portion of the prepit, the thickness $t_7$ of the dye layer on the portion between prepits, the total optical path $OL_{P1}$ of optical path length of the substrate and optical path of the dye layer on the bottom portion of the prepit, the total optical path $OL_{L1}$ of optical path of the substrate and optical path of the dye layer on the portion between prepits, and the modulation degree of the prepit signal of 11T, by the following evaluation methods.

1) Thickness $t_8$ of the dye layer on the bottom portion of the prepit

The thickness $t_8$ (absolute film thickness) of the dye layer on the bottom portion of the prepit was measured through observation of a section of the recording medium using an electron microscope of ultra-high resolution (S900, produced by Hitachi, Ltd.).

2) Thickness $t_7$ of the dye layer on the area between pits

The thickness $t_7$ (absolute layer thickness) of the dye layer on the portion between prepits was measured in the similar manner to that of the above evaluation method 1).

3) Optical path $OL_{P1}$

A separately prepared thin dye film was measured on the reflectance, transmittance and absolute thickness, and from these results, a refractive index $n_D$ of the dye layer of each medium was determined. Using thus determined refractive index of the dye layer, the optical path $OL_{P1}$ was calculated by the aforementioned formula.

The portion $d_{P1}$ of the substrate shown in FIG. 4 is common to both the bottom portion of the prepit and the portion between prepits, so that each value of the optical path $OL_{P1}$ set forth in Table 2 is a value obtained by subtracting the optical path of this portion $d_{P1}$ from the above-obtained optical path.

4) Optical path $OL_{L1}$

The optical path length $OL_{L1}$ was determined in the similar manner to that of the above evaluation method 3).

5) Modulation degree of reproduced signal of 11T

A direct current reproduced signal (signal intensity) having a recording length of 11T out of the recorded CD format signal was measured in the signal portion and the mirror portion (i.e., non-signal portion), and the modulation degree (C) of the reproduced signal was determined from the maximum intensity and the minimum intensity of the reproducing signal by the following formula:

$$C = \frac{SH - SL}{SH} \times 100$$

wherein SH is a maximum intensity of the signal, and SL is a minimum intensity of the signal.

6) Evaluation of the pregroove area

Signal was recorded on the bottom portion of the pregroove of each information recording medium using a disc-evaluation device (NA: 0.5, laser wavelength: 780 nm) and EFM encoder (KEN-WOOD) under the conditions of a laser power for recording signal (recording power) of 6 mW and a fixed linear speed of 1.3 m/sec.

The modulation degree of a signal of 11T reproduced from the recorded area was measured in the similar manner to that of the above evaluation method 5).

TABLE 2

| | Thickness of Dye Layer (nm) | | Optical Path Length (nm) | | Modulation Degree (11T) | Evaluation of |
|---|---|---|---|---|---|---|
| | Bottom portion | between prepits | $OL_{P1} -$ $n_B \cdot d_{P1}$ | $OL_{L1} -$ $n_B \cdot d_{P1}$ | of Prepit area (%) | Recording Area |
| Ex. 13 | 650 | 160 | 650 | 540 | 74 | 65 |

TABLE 2-continued

| | Thickness of Dye Layer (nm) | | Optical Path Length (nm) | | Modulation Degree (11T) | Evaluation of |
|---|---|---|---|---|---|---|
| | Bottom portion | between prepits | $OL_{P1} - n_B \cdot d_{P1}$ | $OL_{L1} - n_B \cdot d_{P1}$ | of Prepit area (%) | Recording Area |
| Com. Ex. 4 | 400 | 230 | 400 | 440 | 20 or less | — |

As is evident from the results set forth in Table 2, the information recording media of the invention (Examples 15 to 17) have high modulation degree on the prepit area (ROM area) and show excellent characteristics.

On the other hand, the information recording medium of comparison example has extremely low modulation degree on the prepit area.

Subsequently, examples 14-30 according to the present invention, particularly to the information recording media (C) and (D) of embodiments thereof and comparison examples 5-7 are given below.

EXAMPLE 14

A disc-shaped polycarbonate substrate (outer diameter: 120 mm, inner diameter: 15 mm, thickness: 1.2 mm, refractive index: 1.58) provided with a pregroove (track pitch: 1.6 μm, half width of pregroove: 0.8 μm, depth of pregroove: 37 nm) within the region of from 44 nm to 47 mm in diameter, prepits (half width of prepit: 0.6 μm, depth of prepit: 110 nm) having been recorded with EFM signal within the region of from 47 mm to 70 mm in diameter and a pregroove (track pitch: 1.6 μm, half width of pregroove: 0.8 μm, depth of pregroove: 37 nm) within the region of from 70 nm to 116 mm in diameter was prepared.

Separately, 3.25 g of a dye (I) (refractive index: 2.8) having the following formula and 0.325 g of a dye (IV) having the following formula were dissolved in a mixture solvent of 2,2,3,3-tetrafluoropropanol 75 ml and ethyl cellosolve 25 ml to prepare a dye solution.

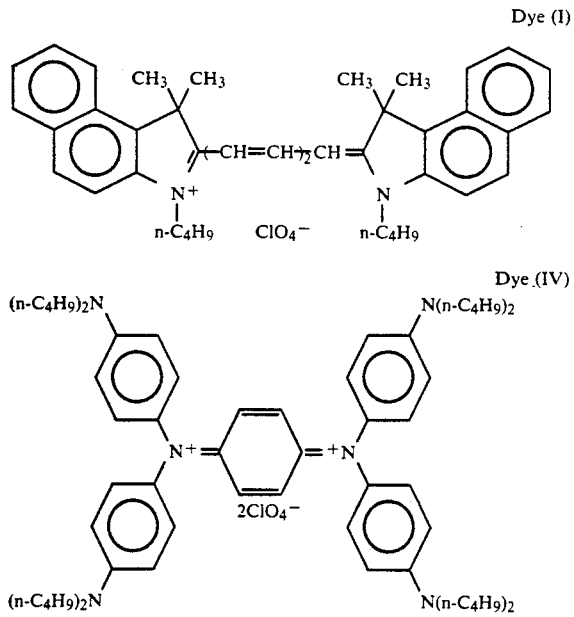

Dye (I)

Dye (IV)

The dye solution was coated over the above-mentioned substrate by means of spin coating under the rotation of the substrate at 200 r.p.m. for 5 seconds. Then, the coated layer of the solution on the substrate was dried under the rotation of the substrate at 2000 r.p.m. for 30 seconds, to form a dye layer having the thicknesses as described below on the substrate.

(1) the bottom portion of the prepit (47-70 mm): 125 nm
(2) the portion between the prepits (47-70 mm): 120 nm
(3) the bottom portion of the pregroove (70-116mm): 125 nm
(4) the land portion of the pregroove (70-116 mm): 120 nm On the dye layer within 42 mm to 118 mm in the diameter was formed a reflecting layer made of Au having a thickness of 100 nm by means of DC sputtering of Au under the conditions of an electric power of 200 W and a Ar gas pressure of 2 Pa.

Then, on the reflecting layer was coated a UV-curable resin (trade name: 3070, available from Three Bond Co., Ltd.) by means of spin coating at 200 r.p.m. and allowed to stand at 1,500 r.p.m. for 30 seconds, and the layer of the resin was irradiated with ultraviolet rays using a high-voltage mercury lamp (200 w/cm) to cure the layer, so as to form a protective layer having a thickness of 2 μm on the reflecting layer.

Thus, an information recording medium consisting of a substrate, a dye recording layer, a reflecting layer and a protective layer was prepared.

EXAMPLE 15

Using the same substrate as used in Example 14 except that the depth of the prepit was 105 nm and the depth of the pregroove was 25 nm, a dye layer having the thicknesses as described below on the substrate, a reflecting layer and a protective layer were superposed in order on the substrate in the same manner as described in Example 14. Thus, an information recording medium was prepared.

(1) the bottom portion of the prepit (47-70 mm): 125 nm
(2) the portion between the prepits (47-70 mm): 120 nm
(3) the bottom portion of the pregroove (70-116 mm): 125 nm
(4) the land portion of the pregroove (70-116 mm): 120 nm

EXAMPLE 16

Using the same substrate as used in Example 14 except that the depth of the prepit was 115 nm and the depth of the pregroove was 40 nm, a dye layer on the substrate, a reflecting layer and a protective layer were superposed in order on the substrate in the same manner as described in Example 14. Thus, an information recording medium was prepared. The resulting dye layer had thicknesses as described below.

(1) the bottom portion of the prepit (47-70 mm): 125 nm
(2) the portion between the prepits (47-70 mm): 120 nm
(3) the bottom portion of the pregroove (70-116mm): 125 nm
(4) the land portion of the pregroove (70-116 mm): 120 nm

EXAMPLE 17

Using the same substrate as used in Example 14 except that the depth of the prepit was 90 nm, a dye layer on the substrate, a reflecting layer and a protective layer were superposed in order on the substrate in the same manner as described in Example 14. Thus, an information recording medium was prepared. The resulting dye layer had thicknesses as described below.
(1) the bottom portion of the prepit (47–70 mm): 125 nm
(2) the portion between the prepits (47–70 mm): 120 nm
(3) the bottom portion of the pregroove (70–116mm): 125 nm
(4) the land portion of the pregroove (70–116 mm): 120 nm

EXAMPLE 18

Using the same substrate as used in Example 14 except that the depth of the pregroove was 50 nm, a dye layer on the substrate, a reflecting layer and a protective layer were superposed in order on the substrate in the same manner as described in Example 14. Thus, an information recording medium was prepared. The resulting dye layer had thicknesses as described below.
(1) the bottom portion of the prepit (47–70 mm: 125 nm
(2) the portion between the prepits (47–70 mm): 120 nm
(3) the bottom portion of the pregroove (70–116mm): 125 nm
(4) the land portion of the pregroove (70–116 mm): 120 nm

COMPARISON EXAMPLE 5

Using the same substrate as used in Example 14 except that the depth of the prepit was 170 nm and the depth of the pregroove was 80 nm, a dye layer on the substrate, a reflecting layer and a protective layer were superposed in order on the substrate in the same manner as described in Example 14. Thus, an information recording medium was prepared. The resulting dye layer had thicknesses as described below.
(1) the bottom portion of the prepit (47–70 mm): 125 nm
(2) the portion between the prepits (47–70 mm): 120 nm
(3) the bottom portion of the pregroove (70–116mm): 125 nm
(4) the land portion of the pregroove (70–116 mm): 120 nm

COMPARISON EXAMPLE 6

Using the same substrate as used in Example 14 except that the depth of the prepit was 80 nm and the depth of the pregroove was 50 nm, a dye layer on the substrate, a reflecting layer and a protective layer were superposed in order on the substrate in the same manner as described in Example 14. Thus, an information recording medium was prepared. The resulting dye layer had thicknesses as described below.
(1) the bottom portion of the prepit (47–70 mm): 125 nm
(2) the portion between the prepits (47–70 mm): 120 nm
(3) the bottom portion of the pregroove (70–116mm): 125 nm
(4) the land portion of the pregroove (70–116 mm): 120 nm

EXAMPLE 19

Using the same substrate as used in Example 14, a dye layer was formed on the substrate in the same manner as described in Example 14 except for using a dye solution having been prepared by dissolving the dyes (I) and (IV) in a mixture solvent of 2,2,3,3-tetrafluoropropanol 68 ml, ethyl cellosolve 25 ml and tetrachloroethane 7 ml, and then a reflecting layer and a protective layer were superposed in order on the dye layer in the same manner as described in Example 14. Thus, an information recording medium was prepared. The resulting dye layer had thicknesses as described below.
(1) the bottom portion of the prepit (47–70 mm): 125 nm
(2) the portion between the prepits (47–70 mm): 115 nm
(3) the bottom portion of the pregroove (70–116mm): 125 nm
(4) the land portion of the pregroove (70–116 mm): 115 nm

EXAMPLE 20

Using the same substrate as used in Example 14, a dye layer was formed on the substrate in the same manner as described in Example 14 except for using a dye solution having been prepared by dissolving the dyes (I) and (IV) in a mixture solvent of 2,2,3,3-tetrafluoropropanol 70 ml, ethyl cellosolve 20 ml and tetrachloroethane 10 ml, and then a reflecting layer and a protective layer were superposed in order on the dye layer in the same manner as described in Example 14. Thus, an information recording medium was prepared. The resulting dye layer had thicknesses as described below.
(1) the bottom portion of the prepit (47–70 mm): 125 nm
(2) the portion between the prepits (47–70 mm): 110 nm
(3) the bottom portion of the pregroove (70–116mm): 125 nm
(4) the land portion of the pregroove (70–116 mm): 110 nm

EXAMPLE 21

Using the same substrate as used in Example 14 except that the depth of the prepit was 170 nm and the depth of the pregroove was 80 nm, a dye layer was formed on the substrate in the same manner as described in Example 14 except for using a dye solution having been prepared by dissolving the dyes (I) and (IV) in a single solvent of 2,2,3,3-tetrafluoropropanol 100 ml, and then a reflecting layer and a protective layer were superposed in order on the dye layer in the same manner as described in Example 14. Thus, an information recording medium was prepared. The resulting dye layer had thicknesses as described below.
(1) the bottom portion of the prepit (47–70 mm): 135 nm
(2) the portion between the prepits (47–70 mm): 95 nm
(3) the bottom portion of the pregroove (70–116mm): 125 nm
(4) the land portion of the pregroove (70–116 mm): 95 nm

COMPARISON EXAMPLE 7

Using the same substrate as used in Example 14, a dye layer was formed on the substrate in the same manner as described in Example 14 except for using a dye solution having been prepared by dissolving the dyes (I) and (IV) in a mixture solvent of 2,2,3,3-tetrafluoropropanol 45 ml, ethyl cellosolve 40 ml and tetrachloroethane 15 ml, and then a reflecting layer and a protective layer were superposed in order on the dye layer in the same manner as described in Example 14. Thus, an information recording medium was prepared. The resulting dye layer had thicknesses as described below.
(1) the bottom portion of the prepit (47–70 mm): 125 nm
(2) the portion between the prepits (47–70 mm): 105 nm (3) the bottom portion of the pregroove (70–116mm): 125 nm (4) the land portion of the pregroove (70–116 mm): 105 nm

EXAMPLE 22

Using the same substrate as used in Example 14 except that the depth of the prepit was 140 nm and the depth of the pregroove was 60 nm, a dye layer was formed on the substrate in the same manner as described in Example 14 except for using a dye solution having been prepared by dissolving the dyes (I) and (IV) in a mixture solvent of 2,2,3,3-tetrafluoropropanol 45 ml, ethyl cellosolve 40 ml and tetrachloroethane 15 ml ethyl cellosolve 40 ml and tetrachloroethane 15 ml, and then a reflecting layer and a protective layer were superposed in order on the dye layer in the same manner as described in Example 14. Thus, an information recording medium was prepared. The resulting dye layer had thicknesses as described below.

(1) the bottom portion of the prepit (47–70 mm): 130 nm
(2) the portion between the prepits (47–70 mm): 105 nm
(3) the bottom portion of the pregroove (70–116mm): 125 nm
(4) the land portion of the pregroove (70–116 mm): 105 nm

EXAMPLE 23

Using the same substrate as used in Example 14 except that the depth of the prepit was 180 nm and the depth of the pregroove was 95 nm, a dye layer was formed on the substrate in the same manner as described in Example 14 except for using a dye solution having been prepared by dissolving 1.75 g of a dye (II) as described below and 0.175 g of the dye (IV) in a single solvent of 2,2,3,3-tetrafluoropropanol 100 ml, and then a reflecting layer and a protective layer were superposed in order on the dye layer in the same manner as described in Example 14. Thus, an information recording medium was prepared. The resulting dye layer had thicknesses as described below.

(1) the bottom portion of the prepit (47–70 mm): 145 nm
(2) the portion between the prepits (47–70 mm): 100 nm
(3) the bottom portion of the pregroove (70–116mm): 140 nm
(4) the land portion of the pregroove (70–116 mm): 100 nm

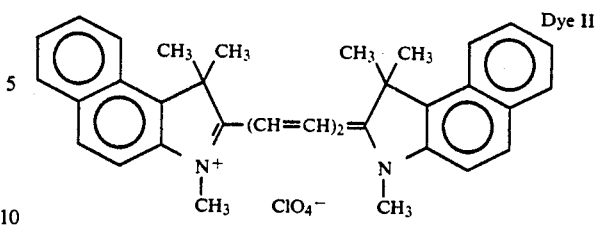

Dye II

EXAMPLE 24

Using the same substrate as used in Example 14 except that the depth of the prepit was 250 nm and the depth of the pregroove was 165 nm, a dye layer was formed on the substrate in the same manner as described in Example 14 except for using a dye solution having been prepared by dissolving 2.6 g of a dye (III) as described below and 0.26 g of the dye (IV) in a single solvent of 2,2,3,3-tetrafluoropropanol 100 ml, and then a reflecting layer and a protective layer were superposed in order on the dye layer in the same manner as described in Example 14. Thus, an information recording medium was prepared. The resulting dye layer had thicknesses as described below.

(1) the bottom portion of the prepit (47–70 mm): 210 nm
(2) the portion between the prepits (47–70 mm): 120 nm
the bottom portion of the pregroove (70–116mm): 200 nm
(4) the land portion of the pregroove (70–116 mm): 120 nm

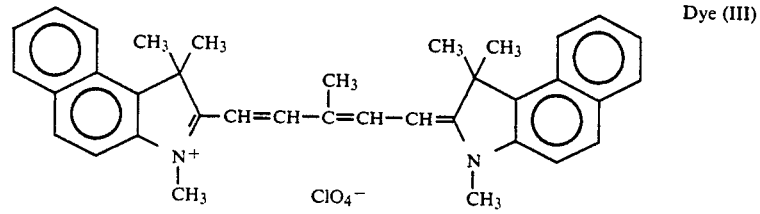

Dye (III)

EXAMPLE 25

Using the same substrate as used in Example 14 except that the depth of the prepit was 105 nm and the depth of the pregroove was 30 nm, a dye layer was formed on the substrate in the same manner as described in Example 14 except for using a dye solution having been prepared by dissolving the dyes (I) and (IV) in a mixture solvent of 2,2,3,3-tetrafluoropropanol 75 ml, propylene glycol monomethyl ether 20 ml and tetrachloroethane 5 ml, and then a reflecting layer and a protective layer were superposed in order on the dye layer in the same manner as described in Example 14. Thus, an information recording medium was prepared. The resulting dye layer had thicknesses as described below.

(1) the bottom portion of the prepit (47–70 mm): 125 nm
(2) the portion between the prepits (47–70 mm): 125 nm
(3) the bottom portion of the pregroove (70–116mm): 125 nm
(4) the land portion of the pregroove (70–116 mm): 125 nm

EXAMPLE 26

Using the same substrate as used in Example 14 except that the depth of the pregroove was 35 nm, a dye layer was formed on the substrate in the same manner as described in Example 14 except for using a dye solution having been prepared by dissolving the dyes (I) and (IV) in a mixture solvent of 2,2,3,3-tetrafluoropropanol 75 ml, diisobutyl ketone 20 ml and tetrachloroethane 5 ml, and then a reflecting layer and a protective layer were superposed in order on the dye layer in the same manner as described in Example 14. Thus, an information recording medium was prepared. The resulting dye layer had thicknesses as described below.
(1) the bottom portion of the prepit (47-70 mm): 125 nm
(2) the portion between the prepits (47-70 mm): 122 nm
(3) the bottom portion of the pregroove (70-116mm): 125 nm
(4) the land portion of the pregroove (70-116 mm): 122 nm

EXAMPLE 27

Using the same substrate as used in Example 14, a dye layer was formed on the substrate in the same manner as described in Example 14 except for using a dye solution having been prepared by dissolving the dyes (I) and (IV) in a mixture solvent of 2,2,3,3-tetrafluoropropanol 75 ml, ethylcaprilate 20 ml and tetrachloroethane 5 ml, and then a reflecting layer and a protective layer were superposed in order on the dye layer in the same manner as described in Example 14. Thus, an information recording medium was prepared. The resulting dye layer had thicknesses as described below.
(1) the bottom portion of the prepit (47-70 mm): 125 nm
(2) the portion between the prepits (47-70 mm): 122 nm
(3) the bottom portion of the pregroove (70-116mm): 125 nm
(4) the land portion of the pregroove (70-116 mm): 122 nm

EXAMPLE 28

Using the same substrate as used in Example 14, a dye layer was formed on the substrate in the same manner as described in Example 14 except for using a dye solution having been prepared by dissolving the dyes (I) and (IV) in a mixture solvent of 2,2,3,3-tetrafluoropropanol 75 ml, 1-pentanol 20 ml and tetrachloroethane 5 ml, and then a reflecting layer and a protective layer were superposed in order on the dye layer in the same manner as described in Example 14. Thus, an information recording medium was prepared. The resulting dye layer had thicknesses as described below.
(1) the bottom portion of the prepit (47-70 mm): 125 nm
(2) the portion between the prepits (47-70 mm): 122 nm
(3) the bottom portion of the pregroove (70-116mm): 125 nm
(4) the land portion of the pregroove (70-116 mm): 122 nm

EXAMPLE 29

Using the same substrate as used in Example 14, a dye layer was formed on the substrate in the same manner as described in Example 14 except for using a dye solution having been prepared by dissolving 3.25 g of the dye (II) and 0.325 g of the dye (IV) in a mixture solvent of 2,2,3,3-tetrafluoropropanol 82 ml, ethyl cellosolve 13 ml and tetrachloroethane 5 ml, and then a reflecting layer and a protective layer were superposed in order on the dye layer in the same manner as described in Example 14. Thus, an information recording medium was prepared. The resulting dye layer had thicknesses as described below.
(1) the bottom portion of the prepit (47-70 mm): 140 nm
(2) the portion between the prepits (47-70 mm): 135 nm
(3) the bottom portion of the pregroove (70-116mm): 140 nm
(4) the land portion of the pregroove (70-116 mm): 135 nm

EVALUATION OF INFORMATION RECORDING MEDIUM

CD format signal was recorded on the bottom portion of the pregroove in the outside region from 72 mm in diameter of the information recording medium obtained in the above using a disc-evaluation device (DDU1000, available from Pulsteck Co., Ltd.: NA: 0.5, laser wavelength: 780 nm) under the conditions of a laser power for recording signal (recording power) of 7.4 mW and a fixed linear speed of 1.4 m/sec.

1) Modulation degree of the prepit area and the pregroove area

Modulation degree of the prepit area was evaluated at a location of 66 mm in diameter of the medium and the that of pregroove area was done at a location of 72 mm. The signal of the medium was reproduced using the above device under the conditions of a laser power for reproduction of 0.5 mW and a fixed linear speed of 1.4 m/sec. A direct current reproduced signal (signal intensity) was measured in the each location, and the modulation degree (C) of the reproduced signal was determined from the maximum intensity and the minimum intensity of the reproducing signal by the following formula:

$$C = \frac{SH - SL}{SH} \times 100$$

wherein SH is a maximum intensity of the signal, and SL is a minimum intensity of the signal.

2) Reflectance of the pregroove area

An average voltage (Ig) of Current reproducing signal was measured on the unrecorded pregroove area at a location of 71 mm in diameter under reproduction of the medium. Reflectance (Ro) of a commercially available CD was measured in its most inside mirror area and the voltage (Io) of the mirror area was measured in the same manner as the above to calculate reflectance of the pregroove area of the medium from the following formula.

$$Reflectance = (Ig/Io) \times Ro \times 100$$

3) Rate of variation of push-pull signal

The signal of the resulting recording media was reproduced using the above device, and tracking error signal generated in the prepit area and pregroove area was measured. Using a maximum amplitude A and a minimum amplitude B obtained by the measurement in each area, the rate of variation was calculated from the following formula.

$$Rate = 2 \times (A-B)/(A+B)$$

The above results are set forth in Tables 3A and 3B.

TABLE 3A

| | Dye | | Solvent (ml) | | | | | | | $d_p$ | $d_g$ | $\Delta t_p$ | $\Delta t_g$ |
| | Kind | Amount (g) | a | b | c | d | e | f | g | (nm) | | (nm) | |
|---|---|---|---|---|---|---|---|---|---|---|---|---|---|
| Ex. 14 | I/IV | 3.25/0.325 | 75 | 20 | 5 | | | | | 110 | 37 | 5 | 5 |
| Ex. 15 | I/IV | 3.25/0.325 | 75 | 20 | 5 | | | | | 105 | 25 | 5 | 5 |
| Ex. 16 | I/IV | 3.25/0.325 | 75 | 20 | 5 | | | | | 115 | 40 | 5 | 5 |
| Ex. 17 | I/IV | 3.25/0.325 | 75 | 20 | 5 | | | | | 90 | 37 | 5 | 5 |
| Ex. 18 | I/IV | 3.25/0.325 | 75 | 20 | 5 | | | | | 110 | 50 | 5 | 5 |
| Com. 5 | I/IV | 3.25/0.325 | 75 | 20 | 5 | | | | | 170 | 80 | 5 | 5 |
| Com. 6 | I/IV | 3.25/0.325 | 75 | 20 | 5 | | | | | 80 | 16 | 5 | 5 |
| Ex. 19 | I/IV | 3.25/0.325 | 68 | 25 | 7 | | | | | 110 | 37 | 10 | 10 |
| Ex. 20 | I/IV | 3.25/0.325 | 70 | 20 | 10 | | | | | 110 | 37 | 15 | 15 |
| Ex. 21 | I/IV | 3.25/0.325 | 100 | | | | | | | 170 | 80 | 40 | 30 |
| Com. 7 | I/IV | 3.25/0.325 | 45 | 40 | 15 | | | | | 110 | 37 | 20 | 20 |
| Ex. 22 | I/IV | 3.25/0.325 | 45 | 40 | 15 | | | | | 140 | 60 | 25 | 20 |
| Ex. 23 | II/IV | 1.75/0.175 | 100 | | | | | | | 180 | 95 | 45 | 40 |
| Ex. 24 | III/IV | 2.65/0.265 | 100 | | | | | | | 250 | 165 | 90 | 80 |
| Ex. 25 | I/IV | 3.25/0.325 | 75 | | 5 | 20 | | | | 105 | 30 | 0 | 0 |
| Ex. 26 | I/IV | 3.25/0.325 | 75 | | 5 | | 20 | | | 110 | 35 | 3 | 3 |
| Ex. 27 | I/IV | 3.25/0.325 | 75 | | 5 | | | 20 | | 110 | 35 | 3 | 3 |
| Ex. 28 | I/IV | 3.25/0.325 | 75 | | 5 | | | | 20 | 110 | 35 | 3 | 3 |
| Ex. 29 | II/IV | 3.25/0.325 | 82 | 13 | 5 | | | | | 110 | 37 | 5 | 5 |

TABLE 3B

| | $1/\lambda$ $(n_s d_p - n_d \Delta t_p)$ | $1/\lambda$ $(n_s d_g - n_d \Delta t_g)$ | Modulation degree (%) | Reflectance (%) | Push-pull Pit | Push-pull Groove |
|---|---|---|---|---|---|---|
| Ex. 14 | 0.20 | 0.06 | 78 | 75 | 0.07 | 0.08 |
| Ex. 15 | 0.19 | 0.03 | 75 | 81 | 0.08 | 0.05 |
| Ex. 16 | 0.22 | 0.06 | 81 | 72 | 0.05 | 0.09 |
| Ex. 17 | 0.16 | 0.06 | 63 | 75 | 0.11 | 0.08 |
| Ex. 18 | 0.20 | 0.08 | 78 | 64 | 0.07 | 0.11 |
| Com. 5 | 0.33 | 0.14 | — | 32 | −0.10 | 0.12 |
| Com. 6 | 0.14 | 0.01 | 53 | 84 | 0.12 | 0.02 |
| Ex. 19 | 0.19 | 0.04 | 72 | 80 | 0.09 | 0.06 |
| Ex. 20 | 0.17 | 0.02 | 65 | 84 | 0.11 | 0.03 |
| Ex. 21 | 0.20 | 0.05 | 77 | 75 | 0.07 | 0.08 |
| Com. 7 | 0.15 | 0.00 | 56 | — | 0.12 | 0.00 |
| Ex. 22 | 0.19 | 0.05 | 75 | 77 | 0.08 | 0.07 |
| Ex. 23 | 0.20 | 0.04 | 76 | 74 | 0.08 | 0.07 |
| Ex. 24 | 0.19 | 0.06 | 75 | 79 | 0.08 | 0.08 |
| Ex. 25 | 0.21 | 0.06 | 80 | 73 | 0.06 | 0.09 |
| Ex. 26 | 0.21 | 0.06 | 80 | 78 | 0.06 | 0.09 |
| Ex. 27 | 0.21 | 0.06 | 80 | 78 | 0.06 | 0.09 |
| Ex. 28 | 0.21 | 0.06 | 80 | 78 | 0.06 | 0.09 |
| Ex. 29 | 0.20 | 0.05 | 78 | 72 | 0.07 | 0.08 | a: 2,2,3,3-tetrafluoropropanol
b: ethyl cellosolve
c: tetrachloroethane
d: propylene glycol monoethyl ether
e: diisobutyl ketone
f: ethylcaprilate
g: 1-pentanol As is apparent from the above result, the information recording media (C) satisfying the specific relationships between the depth on the prepit and its thickness of the dye layer, and between the depth on the pregroove and its thickness of the dye layer, exhibit a high modulation degree and reflectance and an excellent tracking property.

Subsequently, examples 30-33 according to the present invention, particularly to the information record ing medium (D) of embodiment thereof are given below.

EXAMPLE 30

A disc-shaped polycarbonate substrate (outer diameter: 120 mm, inner diameter: 15 mm, thickness: 1.2 mm) having a prepit area (half width: 0.6 μm, depth: 120 nm) having been recorded with EFM signal within the region of from 46 mm to 70 mm in diameter and within the region of from 116 mm to 118 mm in diameter, and having a pregroove area (half width: 0.45 μm, depth: 45 nm) within the region of from 42 mm to 46 mm in diameter and within region of from 70 mm to 116 mm in diameter was prepared.

Separately, a dye (I) having the following formula was dissolved in propylene glycol monoethyl ether to prepare a dye solution containing 2.4 wt. % of the dye (I).

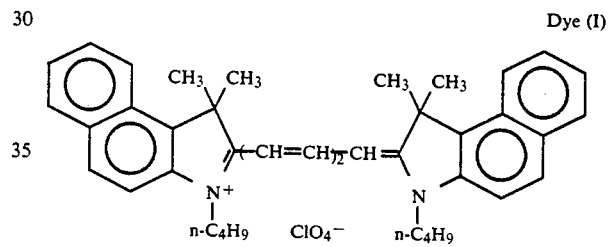

Dye (I)

Thus obtained dye solution had a concentration limit of 80% at 23° C.

The dye solution was kept at 23° C., and the dye solution was coated over the above-mentioned substrate having a temperature of 23° C. by means of spin coating under the rotation of the substrate at 200 r.p.m. for 4 seconds. Then, the coated layer of the solution on the substrate was dried under the rotation of the substrate at 700 r.p.m. for 30 seconds, to form a dye layer on the substrate. The optical film-thickness of the dye layer on the bottom portion of the prepit was 360 nm, and the optical thickness thereof on the portion between prepits was 320 nm.

On the dye layer was formed a reflecting layer made of Au having a thickness of 100 nm by means of DC sputtering of Au under the conditions of an electric power of 480 W, a target-substrate distance of 95 mm, a gas pressure of 2 Pa and a rate of 2 nm/sec.

Then, on the reflecting layer was coated a UV-curable resin (trade name: 3070, available from Three Bond Co., Ltd.) by means of spin coating at 1,500 r.p.m., to form a protective layer having a thickness of 2 μm on the reflecting layer.

Thus, an information recording medium consisting of a substrate, a dye recording layer, a reflecting layer and a protective layer was prepared.

The obtained information recording medium was evaluated by the following evaluation methods. As a result, the modulation degree of the prepit area was 68%, the reflectance of the prepit area was 84%, and the modulation degree of the pregroove area was 64%.

Further, signal existing all over the area of the information recording medium was capable of being reproduced by commercially available reproducing machines such as a CD-ROM player.

EVALUATION OF INFORMATION RECORDING MEDIUM

Signal was recorded on the bottom portion of the pregroove of the information recording medium obtained in the above using a disc-evaluation device (NA: 0.5, laser wavelength: 780 nm) and EFM encoder (KEN-WOOD) under the conditions of a laser power for recording signal (recording power) of 6 mW and a fixed linear speed of 1.3 m/sec.

1) Thickness of the dye layer on the bottom portion of the prepit and on the portion between prepits An absolute thickness of the dye layer was measured through observation of a section of the recording medium using an electron microscope of ultra-high resolution (S900, produced by Hitachi, Ltd.).

2) Modulation degree of the prepit area

A direct current reproduced signal (signal intensity) having a recording length of 11T out of the recorded CD format signal was measured in the signal portion and the mirror portion (i.e., non-signal portion), and the modulation degree (C) of the reproduced signal was determined from the maximum intensity and the minimum intensity of the reproducing signal by the following formula:

$$C = \frac{SH - SL}{SH} \times 100$$

wherein SH is a maximum intensity of the signal, and SL is a minimum intensity of the signal.

3) Reflectance of the prepit area

The value of SH in the above evaluation method 2) was compared with that of an information recording medium having known reflectance, and then subjected to calibration.

4) Modulation degree of the pregroove portion

The signal reproduced from the area recorded with information was subjected to the same evaluation method as the above evaluation method 2), to measure the modulation degree of the reproduced signal on the pregroove area.

EXAMPLE 31

The procedures of Example 30 were repeated except for using the same disc-shaped polycarbonate substrate as that of Example 34 except that the prepit area was formed within the region of from 46 mm to 70 mm in diameter and the pregroove are was formed within the region of from 70 to 116 mm in diameter, to prepare an information recording medium.

In the obtained information recording medium, a modulation degree of the prepit area, a reflectance of the prepit area and a modulation degree of the pregroove area were the same as those of the information recording medium obtained in Example 30.

Also, signal existing all over the area of the information recording medium was capable of being reproduced by commercially available reproducing machines such as a CD-ROM player.

EXAMPLE 32

The procedures of Example 30 were repeated except for using the same disc-shaped polycarbonate substrate as that of Example 34 except that the prepit area was formed within the region of from 50 mm to 70 mm in diameter and the pregroove area was formed within the region of from 46 to 70 mm in diameter (i.e., region wherein control information of the area of 70–118 mm in diameter is to be additionally recorded) and within the region of from 70 mm to 118 mm, to prepare an information recording medium.

In the obtained information recording medium, a modulation degree of the prepit area, a reflectance of the prepit area and a modulation degree of the pregroove area were the same as those of the information recording medium obtained in Example 30.

Also, signal existing all over the area of the information recording medium was capable of being reproduced by commercially available reproducing machines such as a CD-ROM player.

EXAMPLE 33

The procedures of Example 30 were repeated except for using the same disc-shaped polycarbonate substrate as that of Example 30 except that the prepit area was formed within the region of from 46 mm to 118 mm in diameter and the pregroove area was formed within the region of from 44 to 46 mm in diameter, to prepare an information recording medium (a).

Further, the procedures of Example 30 were repeated except for using the same disc-shaped polycarbonate substrate as that of Example 30 except that the pregroove area was formed within the region of from 46 to 118 mm in diameter, to prepare an information recording medium (b).

In each of the obtained information recording media (a) and (b), a modulation degree of the prepit area, a reflectance of the prepit area and a modulation degree of the pregroove portion were the same as those of the information recording medium obtained in Example 30.

Also in each case, signal existing all over the area of the information recording medium was capable of being reproduced by commercially available reproducing machines such as a CD-ROM player.

The information recorded on the prepit area of the information recording medium (a) was copied onto the pregroove area of the information recording medium (b) using a reproducing and copying machine capable of copying from digital to digital. In the stage of reproducing the information from the information recording medium (a), a system was incorporated into the machine such a manner that the information was able to be copied by means of a digital-to-digital copy. After copy of the information was permitted, the medium was designed such a manner that signal of 3T were recorded on the area of 45 mm in diameter, and then copy of information was started. As a result, any other copy from the information recording medium (a) was impossible.

We claim:

1. An information recording medium comprising a disc-shaped substrate provided with a prepit area containing prepits and a pregroove area containing a pregroove, and a reflecting layer made of a metal which is provided on a dye layer, wherein the dye layer is a continuous layer formed on both the prepit area and the pregroove area, and the prepit area has a modulation degree not less than 50%.

2. The information recording medium as claimed in claim 1, wherein difference between an optical thickness of the dye layer on the bottom portion of each of the prepits and that of the dye layer on the portion between the adjoining prepits is not more than λ/8, λ being a wavelength of a reproducing laser beam.

3. The information recording medium as claimed in claim 1, wherein each of the prepits has a half width of 0.2 to 1.4 μm and a depth of 150 to 400 nm, and the total optical path of an optical path of the substrate and that of the dye layer on the bottom portion of each of the prepits is longer than the total optical path of an optical path of the substrate and that of the dye layer on the portion between the adjoining prepits by not less than λ/8, λ being a wavelength of a reproducing laser beam.

4. The information recording medium as claimed in claim 1, wherein difference between an optical thickness of the dye layer on the bottom portion of the pregroove and that of the dye layer on a land portion thereof is not more than λ/8, λ being a wavelength of a reproducing laser beam.

5. The information recording medium as claimed in claim 1, wherein each of the prepits has a half width of 0.2 to 1.4 μm and a depth of 150 to 400 nm; the pregroove has a half width of 0.2 to 1.4 μm and a depth of 70 to 200 nm; the depth of each of the prepits is larger than the depth of the pregroove by not less than λ/8 (λ is a wavelength of a reproducing laser beam) in terms of optical path; and the total optical path of an optical path of the substrate and that of the dye layer on the bottom portion of each of the prepits is longer than the total optical path of an optical path of the substrate and that of the dye layer on the portion between the adjoining prepits by not less than λ/8 (λ is the same as defined above).

6. The information recording medium as claimed in claim 1, wherein the prepit area is divided into two areas which are arranged in both sides of the pregroove area.

7. The information recording medium as claimed in claim 1, wherein the pregroove area is divided into two areas which are arranged in both sides of the prepit area.

8. The information recording medium as claimed in claim 1, wherein the prepit area and the pregroove area both are divided into two more areas, respectively, and the divided prepit areas and pregroove areas are arranged in side by side.

9. The information recording medium as claimed in claim 1, wherein the relationship between a depth of each of the prepits and thickness of the dye layer in the prepit area satisfies the following formula (I):

$$0.15\lambda \leq n_s d_p - n_d \Delta t_p \leq 0.24\lambda \qquad (I)$$

and the relationship between a depth of the pregroove and thickness of the dye layer in the pregroove area satisfies the following formula (II):

$$0.02\lambda \leq n_s d_g - n_d \Delta t_g \leq 0.08\lambda \qquad (II)$$

in which $n_s$ represents a refractive index of the substrate, $n_d$ represents a refractive index of the dye layer, $d_p$ represents a depth of each of the prepits, $\Delta t_p$ represents difference between thickness of the dye layer on the bottom portion of each of the prepits and that of the dye layer on the portion between the adjoining prepits, $d_g$ represents a depth of the pregroove, $\Delta t_g$ represents difference between thickness of the dye layer on the bottom portion of the pregroove and that of the dye layer on a land portion, and λ represents a wavelength of a reproducing laser beam.

10. A process for the preparation of an information recording medium comprising the steps of:

coating a substrate provided with a prepit area containing prepits and a pregroove area containing a pregroove with a dye solution having a concentration limit of 99 to 20% prepared by dissolving a dye in a solvent by means of spin coating, the concentration limit being defined as a ratio of a volume of a dye suspension when the dye of the dye solution starts to precipitate through evaporation of the solvent from the dye solution at the coating temperature to an initial volume of the dye solution;

drying the coated layer to form a dye layer in which a difference between an optical thickness of the dye layer on the bottom portion of the prepit and that of the dye layer on the area between the adjoining prepits is not more than λ/8 when the substrate is provided with the prepits, λ being a wavelength of a reproducing laser beam; and then providing a reflecting layer made of a metal on the dye layer.

11. The process for the preparation of an information recording medium as claimed in claim 10, wherein the dye layer is provided such a manner that difference between an optical thickness of the dye layer on the bottom portion of the pregroove and that of the dye layer on a land portion is not more than λ/8, λ being a wavelength of a reproducing laser beam.

* * * * *